United States Patent
Abe et al.

(10) Patent No.: US 10,464,575 B2
(45) Date of Patent: Nov. 5, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masaaki Abe, Wako (JP); Kunimichi Hatano, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 15/598,440

(22) Filed: May 18, 2017

(65) Prior Publication Data

US 2017/0334454 A1 Nov. 23, 2017

(30) Foreign Application Priority Data

May 19, 2016 (JP) .................................. 2016-100608

(51) Int. Cl.
| | |
|---|---|
| *B60W 50/08* | (2012.01) |
| *B60W 40/09* | (2012.01) |
| *B60W 30/18* | (2012.01) |
| *B60W 10/20* | (2006.01) |
| *B60W 30/14* | (2006.01) |
| *B60W 30/16* | (2012.01) |

(Continued)

(52) U.S. Cl.
CPC .......... *B60W 50/082* (2013.01); *B60W 10/20* (2013.01); *B60W 30/143* (2013.01);

(Continued)

(58) Field of Classification Search
CPC ...... B60W 50/08; B60W 40/09; B60W 30/09; B60W 30/18; G05D 1/00; B60G 1/015; A61M 21/00; G01C 21/20
See application file for complete search history.

(56) References Cited

U.S. PATENT DOCUMENTS

| | | | | |
|---|---|---|---|---|
| 5,854,987 | A | * | 12/1998 | Sekine ..................... B62D 1/28 701/41 |
| 10,067,505 | B2 | * | 9/2018 | Ichikawa ............. G05D 1/0061 |

(Continued)

FOREIGN PATENT DOCUMENTS

| | | |
|---|---|---|
| CN | 105539441 A | 5/2016 |
| CN | 105593104 A | 5/2016 |

(Continued)

OTHER PUBLICATIONS

Notification of Reasons for Refusal dated Mar. 27, 2018, issued in counterpart Japanese application No. 2016-100608, with English translation. (8 pages).

*Primary Examiner* — Yuri Kan

(74) *Attorney, Agent, or Firm* — Westerman, Hattori, Daniels & Adrian, LLP

(57) ABSTRACT

A vehicle control system includes: a reception section configured to receive a selection operation for one or more driving modes by an occupant of a vehicle from out of plural driving modes having different control characteristics related to acceleration/deceleration or cornering; and an automated driving controller configured to perform automated driving in which at least one of speed control and steering control of the vehicle is controlled automatically based on the driving mode received as the selection operation by the reception section.

12 Claims, 19 Drawing Sheets

(51) Int. Cl.
*G05D 1/00* (2006.01)
*B60W 50/00* (2006.01)

(52) U.S. Cl.
CPC ............ *B60W 30/16* (2013.01); *B60W 30/18* (2013.01); *B60W 30/18163* (2013.01); *B60W 50/0098* (2013.01); *G05D 1/0088* (2013.01); *B60W 2050/0063* (2013.01); *B60W 2050/0089* (2013.01); *B60W 2420/42* (2013.01); *B60W 2420/52* (2013.01); *B60W 2510/202* (2013.01); *B60W 2520/125* (2013.01); *B60W 2520/14* (2013.01); *B60W 2540/10* (2013.01); *B60W 2540/12* (2013.01); *B60W 2540/18* (2013.01); *B60W 2540/28* (2013.01); *B60W 2550/10* (2013.01); *B60W 2550/20* (2013.01); *B60W 2550/302* (2013.01); *B60W 2550/308* (2013.01); *B60W 2710/20* (2013.01)

(56) References Cited

U.S. PATENT DOCUMENTS

| | | | | |
|---|---|---|---|---|
| 2013/0110343 | A1* | 5/2013 | Ichikawa | B60W 50/10 701/23 |
| 2015/0224845 | A1* | 8/2015 | Anderson | B60G 17/019 701/37 |
| 2016/0229397 | A1* | 8/2016 | Muthukumar | B60R 21/013 |
| 2017/0028163 | A1* | 2/2017 | Onuma | B60W 40/09 |
| 2017/0240176 | A1* | 8/2017 | Aoki | B60W 30/18163 |

FOREIGN PATENT DOCUMENTS

| | | | |
|---|---|---|---|
| JP | 2007-302055 A | 11/2007 | |
| JP | 2014-46748 A | 3/2014 | |
| JP | 2015-089801 A | 5/2015 | |
| JP | 2015089801 A * | 5/2015 | ............ B60W 40/09 |
| WO | 2011/158347 A1 | 12/2011 | |

* cited by examiner

188

| DRIVING MODE<br>NON-DRIVING<br>OPERATION SYSTEM | MANUAL DRIVING MODE | AUTOMATED DRIVING MODE | | | ... |
|---|---|---|---|---|---|
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

FIG. 16

| TRAVEL CONTROL MODE \ CONTROL CHARACTERISTICS | RELATIVE SPEED (TO VEHICLE BEING OVERTAKEN) | ACCELERATION | INTER-VEHICLE DISTANCE |
|---|---|---|---|
| ECO/AUTOMATED DRIVING | FIRST THRESHOLD VALUE (40 km/h OR GREATER) | Th1(a) | Th1(b) |
| NORMAL/AUTOMATED DRIVING | SECOND THRESHOLD VALUE (20 km/h OR GREATER) | Th2(a) | Th2(b) |
| SPORTS/AUTOMATED DRIVING | THIRD THRESHOLD VALUE (10 km/h OR GREATER) | Th3(a) | Th3(b) |

190

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-100608, filed May 19, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

Recently, research into controlling vehicles so as to drive automatically (referred to hereafter as "automated driving") is progressing (see, for example, International Publication No. 2011/158347).

However, in related technology, preferences of a user with regard to control characteristics relating to acceleration/deceleration or cornering are not reflected in automated driving.

SUMMARY

The present disclosure describes, for example, a vehicle control system, vehicle control method, and vehicle control program capable of reflecting the preferences of a user with regard to control characteristics relating to acceleration/deceleration or cornering in automated driving.

A first aspect of the disclosure describes a vehicle control system including: a reception section configured to receive a selection operation for one or more driving modes by an occupant of a vehicle from out of plural driving modes having different control characteristics related to acceleration/deceleration or cornering; and an automated driving controller configured to perform automated driving in which at least one of speed control or steering control of the vehicle is controlled automatically based on the driving mode received as the selection operation by the reception section.

In a second aspect of the disclosure, configuration may be made wherein in the vehicle control system according to the first aspect, the reception section is configured to receive a selection operation for one or more driving modes from out of a first driving mode, a second driving mode having a higher energy efficiency than the first driving mode, and a third driving mode having looser restrictions related to acceleration/deceleration or cornering than the first driving mode.

In a third aspect of the disclosure, configuration may be made wherein, in the vehicle control system according to the second aspect, when a relative speed between the vehicle and another vehicle traveling ahead of the vehicle is a threshold value or greater, the automated driving controller is configured to perform control to overtake the other vehicle, and a threshold value in the third driving mode is smaller than a threshold value in the first driving mode.

In a fourth aspect of the disclosure, configuration may be made wherein in the vehicle control system according to any one of the first aspect to the third aspect, when overtaking another vehicle traveling ahead of the vehicle executing the automated driving, the automated driving controller is configured to change some or all out of a relative speed between the vehicle and the other vehicle, an inter-vehicle distance, or an acceleration rate of the vehicle, based on the driving mode.

In a fifth aspect of the disclosure, configuration may be made wherein in the vehicle control system according to any one of the first aspect to the fourth aspect, in addition to receiving the selection operation, the reception section is also configured to receive a selection operation to transition to the automated driving from manual driving in which control is based on an operation device configured to receive an operation of the occupant of the vehicle.

In a sixth aspect of the disclosure, configuration may be made wherein in the vehicle control system according to the fifth aspect, the reception section includes a push input section configured to receive a selection operation to transition from the manual driving to the automated driving, and a dial input section configured to receive a selection operation for the plural driving modes.

In a seventh aspect of the disclosure, configuration may be made wherein in the vehicle control system according to any one of the first aspect to the sixth aspect, the automated driving controller is configured to switch from the automated driving to manual driving in which control is based on an operation device configured to receive an operation of the occupant of the vehicle, and control based on the operation device when manual driving is being implemented is reflected in the driving modes.

In an eighth aspect of the disclosure, configuration may be made wherein the vehicle control system according to any one of the first aspect to the seventh aspect further includes: a storage section stored with a feature amount of an image captured of a person and the driving mode associated with the feature amount; an imaging section configured to capture an image within the vehicle; and an analysis and determination section configured to extract a feature amount from an image captured by the imaging section, and determine whether or not the extracted feature amount matches the feature amount stored in the storage section. The automated driving controller is configured to set the driving mode associated with the feature amount stored in the storage section when the analysis and determination section has determined that the feature amounts match.

In a ninth aspect of the disclosure, configuration may be made wherein the vehicle control system according to the seventh aspect further includes a processor configured to generate a parameter of the driving mode based on information about control based on the operation device while the manual driving is being implemented.

In a tenth aspect of the disclosure, configuration may be made wherein the vehicle control system according to any one of the first aspect to the ninth aspect further includes a processor configured to associate the driving mode with each predetermined segment based on information about the driving mode set by the automated driving controller and information retained by the vehicle when setting the driving mode.

An eleventh aspect of the disclosure describes a vehicle control method executed by an on-board computer, the method including: receiving a selection operation for one or more driving modes by an occupant of a vehicle from out of plural driving modes having different control characteristics related to acceleration/deceleration or cornering; and performing automated driving in which at least one of speed control or steering control of the vehicle is controlled automatically based on the driving mode received as the selection operation.

A twelfth aspect of the disclosure describes a vehicle control program for causing an on-board computer to execute processing, the processing including: receiving a selection operation for one or more driving modes by an occupant of a vehicle from out of plural driving modes having different control characteristics related to acceleration/deceleration or cornering; and performing automated driving in which at least one of speed control or steering control of the vehicle is controlled automatically based on the driving mode received as the selection operation.

According to the first, second, fourth, eleventh, and twelfth aspects of the disclosure, for example, a selection operation for the plural driving modes with different control characteristics related to acceleration/deceleration or cornering is received, and the driving mode received as the selection operation is executed. This thereby enables the preferences of the user with respect to control characteristics related to acceleration/deceleration or cornering to be reflected during automated driving.

According to the third aspect of the disclosure, for example, a travel control mode is selected from out of travel control modes having different references for overtaking a vehicle traveling ahead of the vehicle, thereby enabling the desired control characteristics of the vehicle occupant to be realized.

According to the fifth aspect of the disclosure, for example, in addition to receiving the plural driving modes, transition to the automated driving from the manual driving in which control is based on the operation device that receives an operation from the occupant of the vehicle is also received, thereby further improving convenience for the user.

According to the sixth aspect of the disclosure, for example, the reception section includes the push input section that receives transition to the automated driving from the manual driving in which control is based on the operation device that receives an operation from the occupant of the vehicle, and the dial input section that receives the plural driving modes. This accordingly further improves convenience for the user.

According to the seventh and ninth aspects of the disclosure, for example, control based on the operation device when manual driving is being implemented is reflected in the driving modes, thereby controlling the vehicle with a driving mode adapted to the vehicle occupant.

According to the eighth aspect of the disclosure, for example, a travel control mode associated with the vehicle occupant is set, thereby further improving convenience for the user.

According to the tenth aspect of the disclosure, for example, the driving mode is associated with each predetermined segment based on the information about the driving mode and the information retained by the vehicle when setting the driving mode, thereby setting a driving mode adapted to the user for each predetermined segment. This further improves convenience for the user.

BRIEF DESCRIPTION OF THE DRAWINGS

The advantages of the disclosure will become apparent in the following description taken in conjunction with the following drawings.

FIG. 16 is a diagram illustrating an example of travel control mode characteristic information.

DETAILED DESCRIPTION

Explanation follows regarding an embodiment of a vehicle control system, a vehicle control method, and a vehicle control program of the present disclosure, with reference to the drawings.

Figure 1:
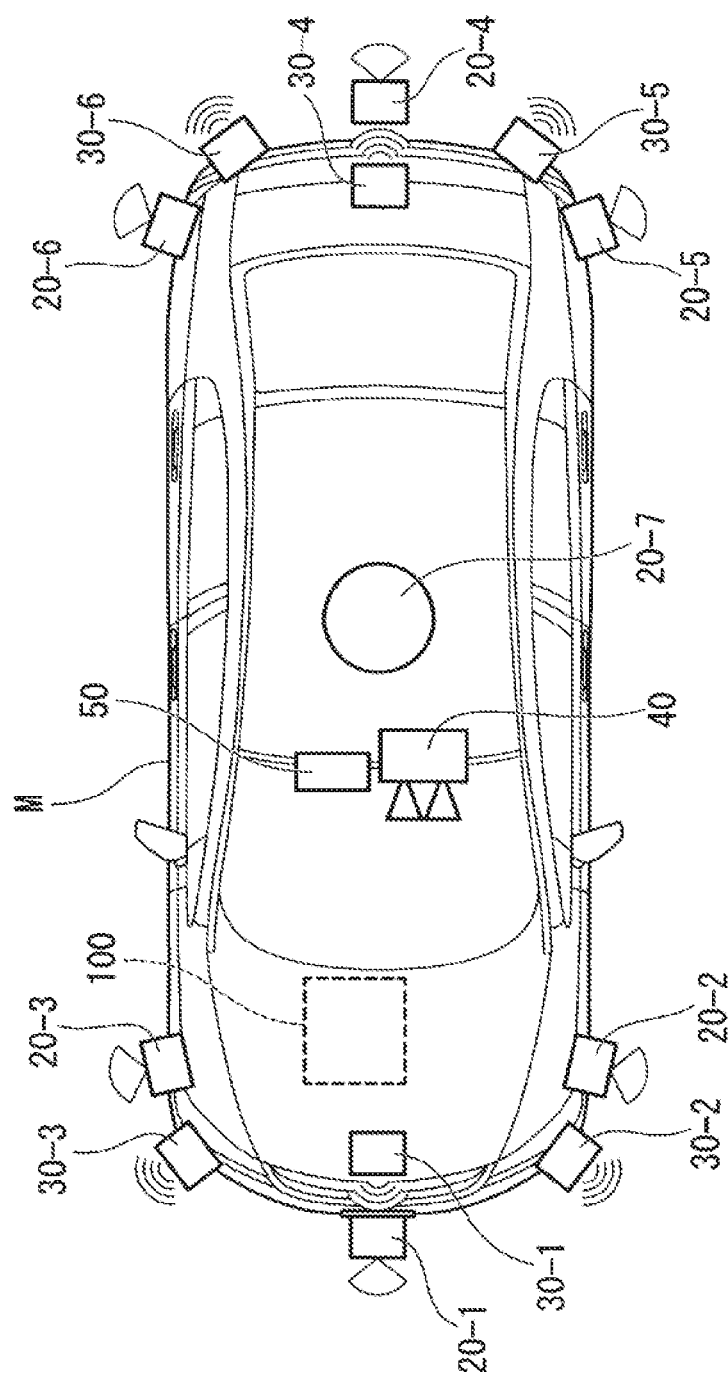
FIG. 1 is a diagram illustrating configuration elements of a vehicle of one embodiment.

FIG. 1 is a diagram illustrating configuration elements of a vehicle (referred to as the vehicle M hereafter) installed with a vehicle control system 100 of respective embodiments. The vehicle installed with the vehicle control system 100 is, for example, a two-wheeled, three-wheeled, or four-wheeled automobile, and this encompasses automobiles having an internal combustion engine such as a diesel engine or gasoline engine as a power source, electric automobiles having an electric motor as a power source, and hybrid automobiles having both an internal combustion engine and an electric motor. Electric automobiles are, for example, driven using electric power discharged from a battery such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40; a navigation device 50; and the vehicle control system 100 are installed to the vehicle M.

The finders 20-1 to 20-7 are, for example, LIDARs (Light Detection and Ranging, or Laser Imaging Detection and Ranging) that measure the scattering of emitted light and measure the distance to a target. For example, the finder 20-1 is attached to a front grille or the like, and the finder 20-2 and the finder 20-3 are attached to a side face of a vehicle body, a door mirror, a front headlamp interior, the vicinity of a side lamp, or the like. The finder 20-4 is attached to a trunk lid or the like, the finder 20-5 and the finder 20-6 are attached to a side face of the vehicle body, a tail light interior, or the like. The finders 20-1 to 20-6 described above have detection regions of, for example, approximately 150° in a horizontal direction. The finder 20-7 is attached to a roof or the like. The finder 20-7 has a detection region of, for example, 360° in the horizontal direction.

The radar 30-1 and the radar 30-4 are, for example, long-range millimeter wave radars having a wider detection region in a depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred to as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or a complementary metal oxide semiconductor (CMOS) element. The camera 40 is attached to a front windshield upper portion, a back face of a rear-view mirror, or the like. The camera 40, for example, periodically and repeatedly images ahead of the vehicle M. The camera 40 may be a stereo camera that includes plural cameras.

Note that the configuration illustrated in FIG. 1 is merely an example; a portion of the configuration may be omitted, and other configuration may be further added.

Figure 2:
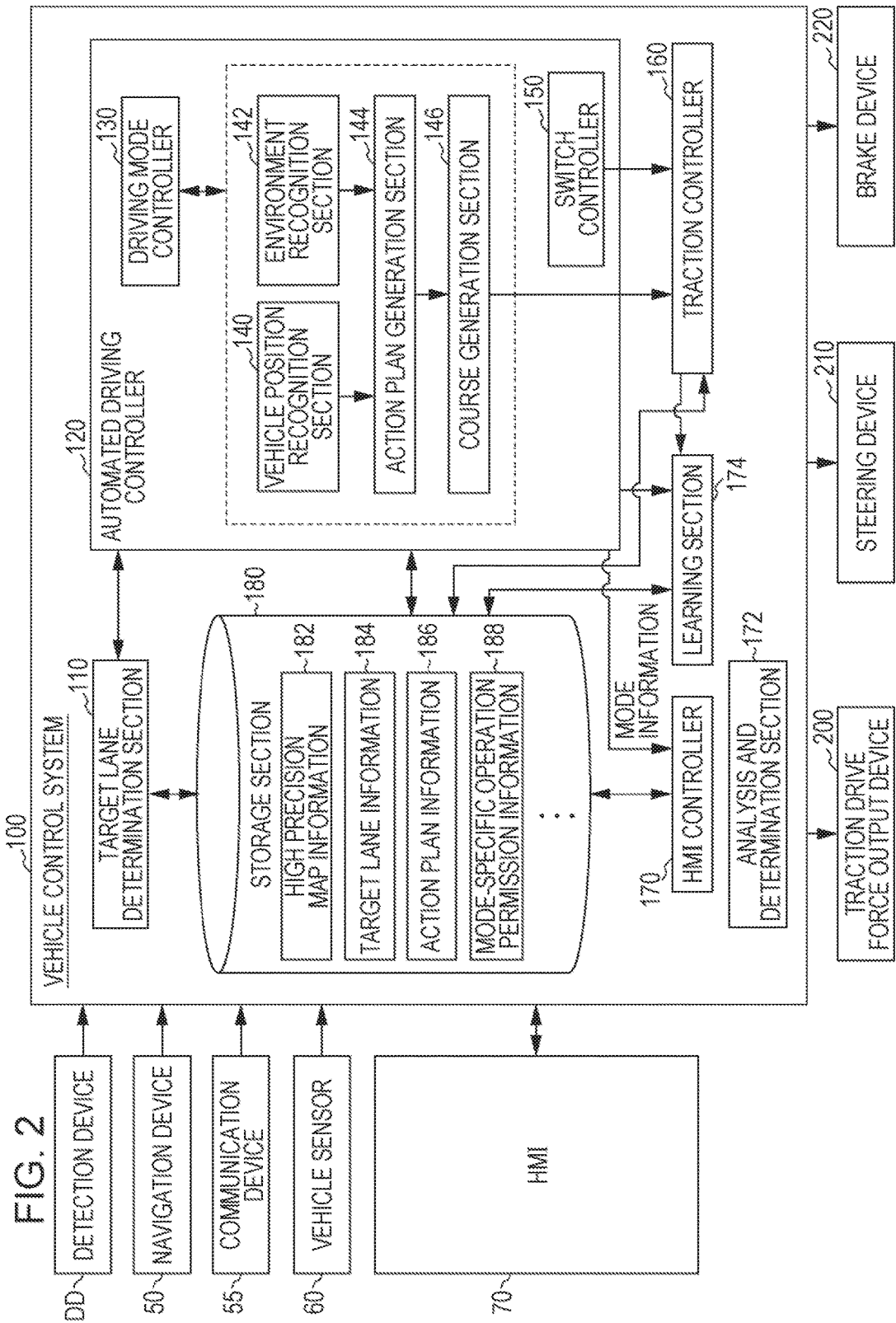
FIG. 2 is a functional configuration diagram focusing on a vehicle control system.

FIG. 2 is a functional configuration diagram focusing on the vehicle control system 100 according to an embodiment. Detection devices DD that include the finders 20, the radars 30, the camera 40, and the like; the navigation device 50; a communication device 55; vehicle sensors 60; a human machine interface (HMI) 70; the vehicle control system 100; a traction drive force output device 200; a steering device 210; and a brake device 220 are installed in the vehicle M. These devices and apparatuses are connected to one another by a multiplex communication line such as a controller area network (CAN) communication line, or by a wireless communication network, a serial communication line, or the like. Note that the vehicle control system within the scope of the claims does not indicate only the "vehicle control system 100" and may include configuration other than that of the vehicle control system 100 (such as the detection devices DD and an HMI 70).

The navigation device 50 includes a global navigation satellite system (GNSS) receiver, map information (a navigation map), a touch panel display device that functions as a user interface, a speaker, a microphone, and the like. The navigation device 50 identifies the position of the vehicle M using the GNSS receiver and derives a route from this position to a destination designated by a user. The route derived by the navigation device 50 is provided to a target lane determination section 110 of the vehicle control system 100. The position of the vehicle M may be identified or complemented by an inertial navigation system (INS) employing output from the vehicle sensors 60. When the vehicle control system 100 is executing a manual driving mode, the navigation device 50 provides guidance along a route to the destination using audio and a navigation display. Note that configuration for identifying the position of the vehicle M may be provided independently from the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55, for example, performs wireless communication using a cellular network, a Wi-Fi network, Bluetooth (registered trademark), or dedicated short range communication (DSRC).

The vehicle sensors 60 include, for example, a vehicle speed sensor that detects vehicle speed, an acceleration sensor that detects acceleration, a yaw rate sensor that detects angular velocity about a vertical axis, and a directional sensor that detects the heading of the vehicle M.

Figure 3:
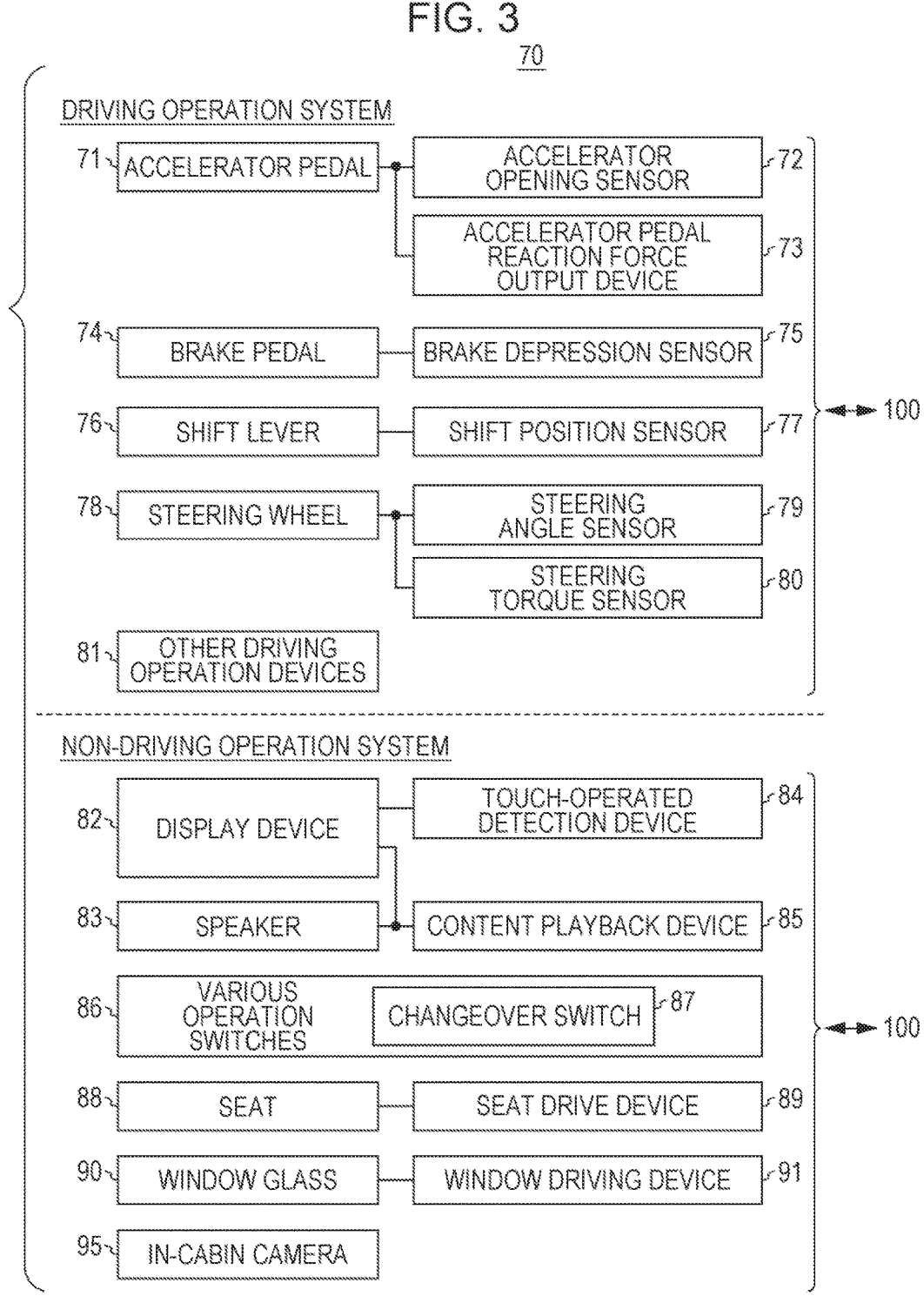
FIG. 3 is a configuration diagram of an HMI.

FIG. 3 is a configuration diagram of the HMI 70. The HMI 70 is provided with, for example, driving operation system configuration and non-driving operation system configuration. There is no clear boundary between the two, and driving operation system configuration may provide non-driving operation system functionality (or vise-versa).

As configuration of the driving operation system, the HMI 70 includes, for example, an accelerator pedal 71, an accelerator opening sensor 72 and an accelerator pedal reaction force output device 73, a brake pedal 74 and a brake depression sensor (or a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions from a vehicle occupant (or deceleration instructions due to return-operation). The accelerator opening sensor 72 detects a depression amount of the accelerator pedal 71, and outputs an accelerator opening signal indicating the depression amount to the vehicle control system 100. Note that output may be made directly to the traction drive force output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) in the opposite direction to the operation direction of the accelerator pedal 71, according to instructions from the vehicle control system 100.

The brake pedal 74 is an operation element for receiving deceleration instructions from the vehicle occupant. The brake depression sensor 75 detects a depression amount of (alternatively, the pressing force on) the brake pedal 74 and outputs a brake signal indicating the detection result to the vehicle control system 100.

The shift lever 76 is an operation element for receiving shift level change instructions from the vehicle occupant.

The shift position sensor 77 detects the shift level instructed by the vehicle occupant and outputs a shift position signal indicating the detection result to the vehicle control system 100.

The steering wheel 78 is an operation element for receiving turning instructions from the vehicle occupant. The steering angle sensor 79 detects the steering angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100.

The other driving operation devices 81 are, for example, an ignition switch that controls an ignition to an ON state or an OFF state, a joystick, a button, a dial switch, a graphical user interface (GUI) switch, and the like. The other driving operation devices 81 receive acceleration instructions, deceleration instructions, turning instructions, and the like and output the instructions to the vehicle control system 100.

As configuration of the non-driving operation system, the HMI 70 includes, for example, a display device 82, a speaker 83, a touch-operated detection device 84 and a content playback device 85, various operation switches 86, a seat 88 and a seat driving device 89, window glass 90 and a window driving device 91, and an in-cabin camera 95.

The display device 82 is, for example, a liquid crystal display (LCD), an organic electroluminescent (EL) display device, or the like attached to a respective section of an instrument panel, a freely selected location facing the front passenger seat and rear seat, or the like. Moreover, the display device 82 may be a head-up display (HUD) that projects an image onto the front windshield or another window. The speaker 83 outputs audio. In cases in which the display device 82 is a touch panel, the touch-operated detection device 84 detects a contact position (touch position) on a display screen of the display device 82, and outputs the contact position to the vehicle control system 100. Note that in cases in which the display device 82 is not a touch panel, the touch-operated detection device 84 may be omitted.

The content playback device 85 includes, for example, a digital versatile disc (DVD) playback device, a compact disc (CD) playback device, a television receiver, various guidance image generation devices, and the like. Some or all out of the display device 82, the speaker 83, the touch-operated detection device 84, and the content playback device 85 may be configured so as to be shared with the navigation device 50.

The various operation switches 86 are disposed at freely selected locations inside the vehicle cabin. The various operation switches 86 include a changeover switch 87 for instructing automated driving to start (or to start in the future) or stop. The changeover switch 87 may be a graphical user interface (GUI) switch or a mechanical switch. The changeover switch 87 will be described in detail later. Moreover, the various operation switches 86 may include a switch for driving the seat driving device 89 or the window driving device 91, a registration switch for registering a vehicle occupant and described later, or the like.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 95 is a digital camera that employs a solid state imaging element such as a CCD or a CMOS element. The in-cabin camera 95 is attached to a position from which at least the head of the vehicle occupant performing driving operation can be imaged, such as the rear-view mirror, steering wheel boss section, or instrument panel. The in-cabin camera 95, for example, images the vehicle occupant periodically and repeatedly.

Prior to explaining the vehicle control system 100, explanation follows regarding the traction drive force output device 200, the steering device 210, and the brake device 220.

The traction drive force output device 200 outputs traction drive force (torque) for causing the vehicle to travel to drive wheels. In cases in which the vehicle M is an automobile that has an internal combustion engine as the power source, the traction drive force output device 200 includes, for example, an engine, a transmission, and an engine electronic control unit (ECU) that controls the engine. In cases in which the vehicle M is an electric automobile that has an electric motor as the power source, the traction drive force output device 200 includes, for example, a traction motor and a motor ECU that controls the traction motor. In cases in which the vehicle M is a hybrid automobile, the traction drive force output device 200 includes, for example, an engine, a transmission, and an engine ECU; and a traction motor and a motor ECU. In cases in which the traction drive force output device 200 includes only an engine, the engine ECU adjusts the engine throttle opening, the shift level, or the like, in accordance with information input from a traction controller 160, described later. In cases in which the traction drive force output device 200 includes only a traction motor, the motor ECU adjusts a duty ratio of a PWM signal applied to the traction motor, in accordance with information input from the traction controller 160. In cases in which the traction drive force output device 200 includes an engine and a traction motor, the engine ECU and the motor ECU cooperatively control traction drive force, in accordance with information input from the traction controller 160.

The steering device 210 includes, for example, a steering ECU and an electric motor. The electric motor, for example, exerts force in a rack-and-pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the traction controller 160, such that braking torque is output to each wheel in accordance with the braking operation. The electric servo brake device may include a mechanism that transmits hydraulic pressure generated due to operation of the brake pedal to the cylinder via a master cylinder as a backup. Note that the brake device 220 is not limited to the electric servo brake device explained above and may be an electronically controlled hydraulic brake device. The electronically controlled hydraulic brake device controls an actuator in accordance with information input from the traction controller 160 and transmits hydraulic pressure of a master cylinder to the cylinder. The brake device 220 may also include a regenerative brake that uses a traction motor which might be included in the traction drive force output device 200.

Vehicle Control System

Explanation follows regarding the vehicle control system 100. The vehicle control system 100 is, for example, implemented by one or more processors, or by hardware having equivalent functionality. The vehicle control system 100 may be configured by a combination of a processor such as a CPU, a storage device, and an ECU (electronic control unit) in which a communication interface is connected by an internal bus, or a micro-processing unit (MPU) or the like.

Returning to FIG. 2, the vehicle control system 100 includes, for example, the target lane determination section 110, an automated driving controller 120, the traction controller 160, an HMI controller 170, an analysis and determination section 172, a learning section (processing section) 174, and the storage section 180. The automated driving controller 120 includes, for example, a driving mode controller 130, a vehicle position recognition section 140, an environment recognition section 142, an action plan generation section 144, a course generation section 146, and a switch controller 150. Some or all out of the target lane determination section 110, the respective sections of the automated driving controller 120, the traction controller 160, the HMI controller 170, the analysis and determination section 172, and the learning section 174 are implemented by the processor executing a program (software). Moreover, of these, some or all may be implemented by hardware such as a large scale integration (LSI) or an application specific integrated circuit (ASIC), or may be implemented by a combination of software and hardware.

Figure 4:
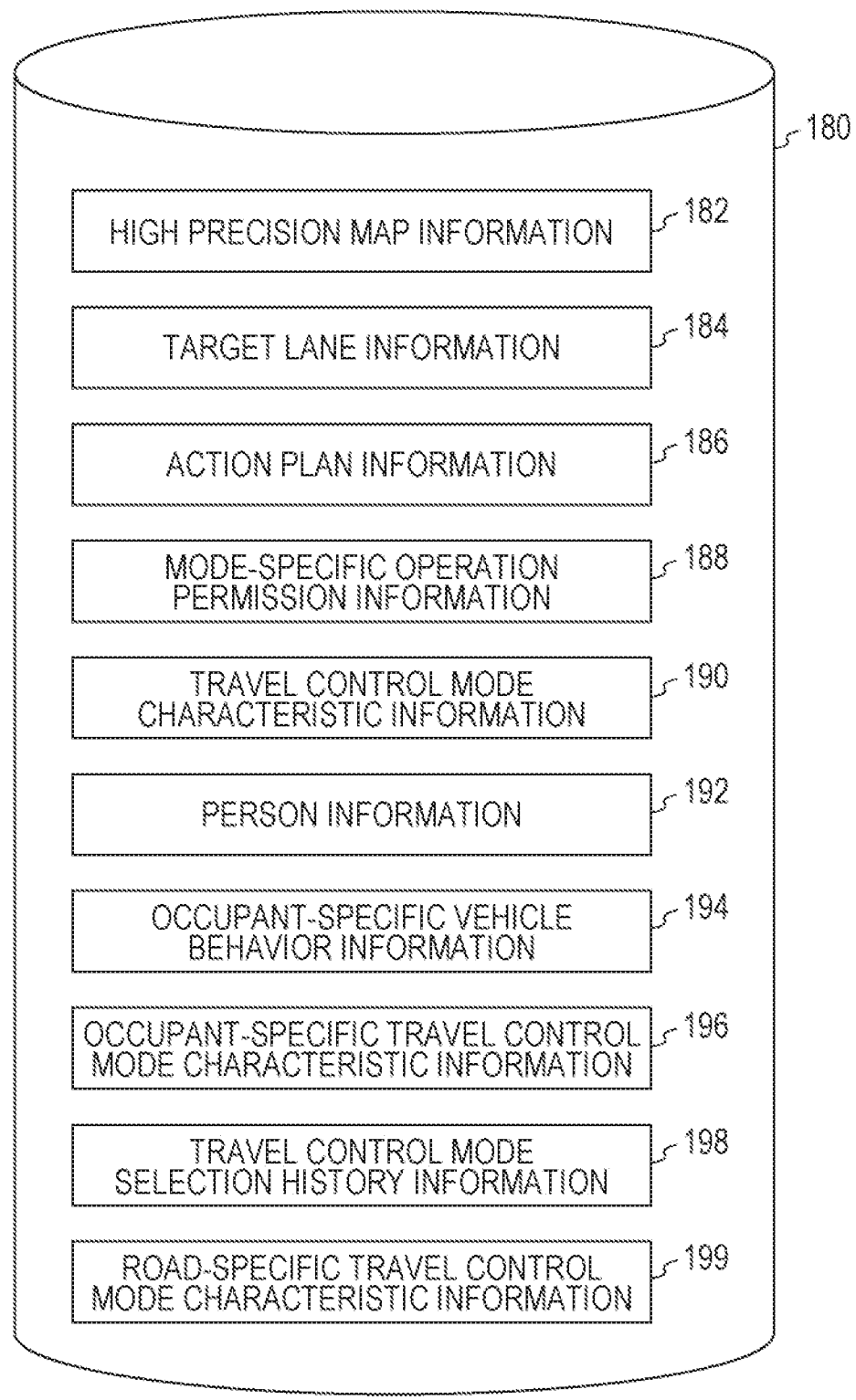
FIG. 4 is a diagram illustrating an example of information stored in a storage section.

FIG. 4 is a diagram illustrating an example of information stored in the storage section 180. The storage section 180 stores information such as high precision map information 182, target lane information 184, action plan information 186, mode-specific operation permission information 188, travel control mode characteristic information 190, person information 192, occupant-specific vehicle behavior information 194, occupant-specific travel control mode characteristic information 196, travel control mode selection history information 198, and road-specific travel control mode characteristic information 199. The storage section 180 is implemented by read only memory (ROM) or random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, the vehicle control system 100 may be configured distributed across plural computer devices.

The target lane determination section 110 is, for example, implemented by an MPU. The target lane determination section 110 divides the route provided from the navigation device 50 into plural blocks (for example, divides the route every 100*m* along the direction of progress of the vehicle), and references the high precision map information 182 to determine the target lane for each block. The target lane determination section 110, for example, determines which lane number from the left to travel in. In cases in which a junction point, a merge point, or the like is present in the route, the target lane determination section 110, for example, determines the target lanes so as to enable the vehicle M to travel along a sensible travel route for advancing beyond the junction. The target lanes determined by the target lane determination section 110 are stored in the storage section 180 as the target lane information 184.

The high precision map information 182 is map information with higher precision than the navigation map of the navigation device 50. The high precision map information 182 includes, for example, lane-center information, lane-boundary information, or the like. The high precision map information 182 may also include, for example, road information, traffic restriction information, address information (address, postal code), facilities information, phone number information, and the like. The road information includes information such as information indicating whether the type of road is an expressway, a toll road, a national highway, or a prefectural road; the number of lanes in the road; the width of each lane; the gradient of the road; the position of the road (three dimensional coordinates including a longitude, a latitude, and an altitude); the curvature of the lanes; the position of lane merge and junction points; and signage provided on the road. The traffic restriction information includes information regarding lane closures due to road work, traffic accidents, congestion, and the like.

Note that the travel control mode characteristic information 190, the person information 192, the occupant-specific vehicle behavior information 194, the occupant-specific travel control mode characteristic information 196, the travel control mode selection history information 198, and the road-specific travel control mode characteristic information 199 will be described in detail later.

The driving mode controller 130 determines the driving mode to be implemented by the automated driving controller 120. The driving modes in the present embodiment include the following automated driving modes having different degrees of automated driving, and travel control modes expressing control characteristics relating to acceleration/deceleration and cornering, described later. Note that the following automated driving modes are merely examples, and the number and type of automated driving modes may be freely determined.

Mode A

Mode A is the mode in which the level of automated driving is highest. In cases in which Mode A is being implemented, all vehicle controls, such as complex merging control, are performed automatically, such that a vehicle occupant does not need to monitor the surroundings or state of the vehicle M.

Mode B

Mode B is the mode having the next highest level of automated driving after Mode A. Although in principle all vehicle control is performed automatically in cases in which Mode B is implemented, the driving operation of the vehicle M may be entrusted to the vehicle occupant depending on the situation. The vehicle occupant therefore needs to monitor the surroundings and state of the vehicle M.

Mode C

Mode C is the mode having the next highest level of automated driving after Mode B. In cases in which Mode C is implemented, the vehicle occupant needs to perform confirmation operations on the HMI 70 depending on the situation. In Mode C, for example, the vehicle occupant is notified of the timing for a lane change, and the lane change is made automatically in cases in which the vehicle occupant has performed an operation on the HMI 70 instructing the lane change. The vehicle occupant therefore needs to monitor the surroundings and state of the vehicle M.

Transition between the automated driving modes and the manual driving mode, and transition between the travel control modes, is, for example, executed by selection operation by the vehicle occupant, using the changeover switch 87.

The driving mode controller 130 determines the automated driving mode based on operation on the HMI 70 by the vehicle occupant, events determined by the action plan generation section 144, traveling states determined by the course generation section 146, and the like. The automated driving mode is notified to the HMI controller 170. Moreover, limits that depend on the performance of the detection devices DD of the vehicle M or the like may be set on the automated driving modes. For example, configuration may be such that the Mode A is not implemented in cases in which the performance of the detection devices DD is low. Whichever the mode, switching to manual driving mode (override) is possible by operating the driving operation system configuration of the HMI 70.

The travel control modes include an eco-mode (second driving mode), a normal mode (first driving mode), and a sports mode (third driving mode). During manual driving, control is made such that energy efficiency increases in the sequence: sports mode—normal mode—eco mode, and permitted ranges of the behavior of the vehicle M are set so as to become broader in the sequence: eco mode—normal mode—sports mode. Note that the relationship between the permitted ranges of behavior in the normal mode and the eco mode may be the opposite to that described above. Settings of the travel control modes will be described in detail later. The automated driving modes and the travel control modes each have separate settings to one another. As a result, there are settings for Mode A, and settings for the sports mode.

The vehicle position recognition section 140 of the automated driving controller 120 recognizes the lane in which the vehicle M is traveling (the travel lane) and the position of the vehicle M relative to the travel lane, based on the high precision map information 182 stored in the storage section 180, and the information input from the finders 20, the radars 30, the camera 40, the navigation device 50, or the vehicle sensors 60.

The vehicle position recognition section 140, for example, recognizes the travel lane by comparing a pattern of road demarcation lines (for example, an array of solid lines and dashed lines) recognized in the high precision map information 182 against a road demarcation line pattern of the surroundings of the vehicle M recognized in the images imaged using the camera 40. In the recognition, the position of the vehicle M acquired from the navigation device 50 or the processing result by the INS may be taken into account.

Figure 5:
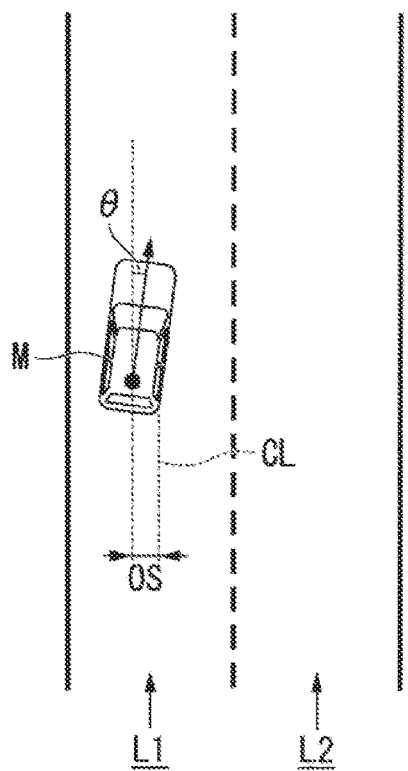
FIG. 5 is a diagram illustrating a state in which the position of a vehicle relative to a travel lane is recognized by a vehicle position recognition section.

FIG. 5 is a diagram illustrating a state in which the relative position of the vehicle M with respect to a travel lane L1 is recognized by the vehicle position recognition section 140. As the relative position of the vehicle M with respect to the travel lane L1, the vehicle position recognition section 140 recognizes an offset OS between a reference point (for example, the center of mass) of the vehicle M and a travel lane center CL, and an angle θ formed between the direction of progress of the vehicle M and a line aligned with the travel lane center CL. Note that, alternatively, the vehicle position recognition section 140 may recognize the position of the reference point of the vehicle M or the like with respect to either of the side end portions of the lane L1 itself as the relative position of the vehicle M with respect to the travel lane. The relative position of the vehicle M recognized by the vehicle position recognition section 140 is provided to the target lane determination section 110.

The environment recognition section 142 recognizes the position, speed, and acceleration states of nearby vehicles based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be presented as representative points such as centers of mass or corners of other vehicles, or may be represented as regions expressed by the outlines of the other vehicles. The "state" of a nearby vehicle may include whether or not the nearby vehicle is accelerating or changing lanes (or whether or not the nearby vehicle is attempting to change lanes), as ascertained based on the information of the various apparatuses described above. The environment recognition section 142 may also recognize the position of a guard rail, a utility pole, a parked vehicle, a pedestrian, and other objects in addition to the nearby vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

The action plan is, for example, composed of plural events to be sequentially executed. The events include, for example: a deceleration event that causes the vehicle M to decelerate, an acceleration event that causes the vehicle M to accelerate, a lane-keep event that causes the vehicle M to travel without departing from the travel lane, a lane-change event that causes the travel lane to change, an overtake event that causes the vehicle M to overtake the vehicle in front, a junction event that causes a lane change to the desired lane at a junction point or causes the vehicle M to travel so as not to depart from the current travel lane, a merge event that causes the vehicle M to accelerate or decelerate in a merging lane for merging with a main lane and changes the travel lane, and a handover event that causes a transition from the manual driving mode to the automated driving mode at a starting point of automated driving or causes a transition from the automated driving mode to the manual driving mode at a point where automated driving is expected to end. The action plan generation section 144 sets a lane-change event, a junction event, or a merge event at places where the target lane determined by the target lane determination section 110 switches. Information indicating the action plan generated by the action plan generation section 144 is stored in the storage section 180 as the action plan information 186.

Figure 6:
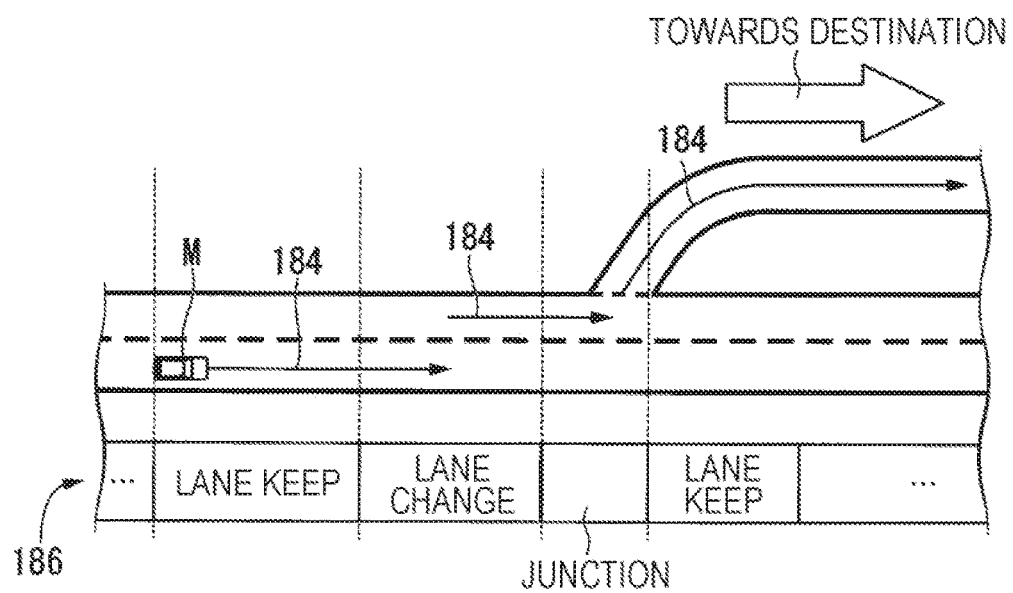
FIG. 6 is a diagram illustrating an example of action plans generated for given segments.

FIG. 6 is a diagram illustrating an example of the action plan generated for a given segment. As illustrated in this figure, the action plan generation section 144 generates the action plan needed for the vehicle M to travel in the target lane indicated by the target lane information 184. Note that the action plan generation section 144 may dynamically change the action plan irrespective of the target lane information 184, in accordance with changes to the conditions of the vehicle M. For example, in cases in which the speed of a nearby vehicle recognized by the environment recognition section 142 during vehicle travel exceeds a threshold value, or the movement direction of a nearby vehicle traveling in a lane adjacent to the vehicle-itself lane is toward the vehicle-itself lane direction, the action plan generation section 144 changes an event set in the driving segments that the vehicle M was expected to travel. For example, in cases in which events have been set such that a lane-change event is to be executed after a lane-keep event, when, during the lane-keep event, the recognition result of the environment recognition section 142 has determined that a vehicle is approaching from the rear in the lane change target lane at a speed at or above a threshold value, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 7:
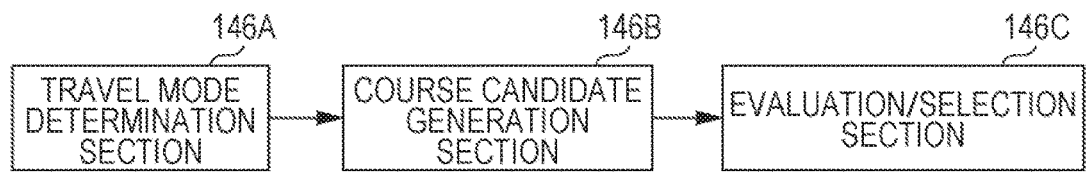
FIG. 7 is a diagram illustrating an example of a configuration of a course generation section.

FIG. 7 is a diagram illustrating an example of the configuration of the course generation section 146. The course generation section 146 includes, for example, a travel mode determination section 146A, a course candidate generation section 146B, and an evaluation/selection section 146C.

When implementing a lane-keep event, the travel mode determination section 146A, for example, determines a travel mode from out of constant speed travel, following-travel, low speed following-travel, decelerating travel, curve travel, obstacle avoidance travel, or the like. In such cases, the travel mode determination section 146A determines that the travel mode is constant speed travel when no other vehicles are present ahead of the vehicle M. The travel mode determination section 146A determines that the travel mode is following-travel in cases such as when a vehicle in front is to be followed. The travel mode determination section 146A determines that the travel mode is low speed following-travel in a congested situation or the like. The travel mode determination section 146A determines that the travel mode is decelerating travel in cases in which deceleration of a vehicle in front has been recognized by the environment recognition section 142, and in cases in which an event for, for example, stopping or parking is implemented. The travel mode determination section 146A determines that the travel mode is curve travel in cases in which the environment recognition section 142 has recognized that the vehicle M is approaching a curve in the road. The travel mode determination section 146A determines that the travel mode is obstacle avoidance travel in cases in which the environment recognition section 142 has recognized an obstacle in front of the vehicle M. Moreover, when carrying out lane-change events, overtake events, junction events, merge events, handover events, or the like, the travel mode determination section 146A determines the travel mode in accordance with each event.

Figure 8:
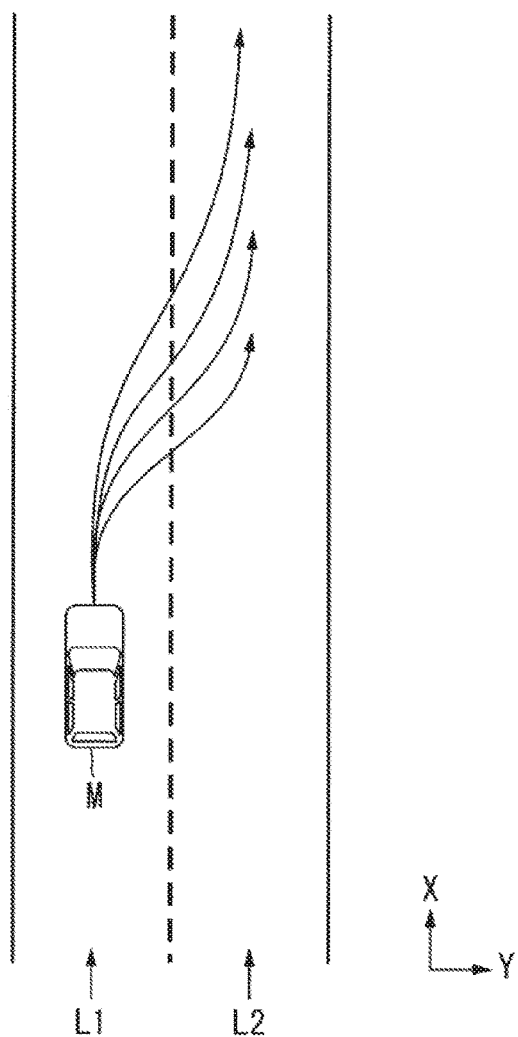
FIG. 8 is a diagram illustrating example candidates for a course generated by a course candidate generation section.

The course candidate generation section 146B generates candidates for a course based on the travel mode determined by the travel mode determination section 146A. FIG. 8 is a diagram illustrating example candidates for a course generated by the course candidate generation section 146B. FIG. 7 illustrates candidates for a course generated when the vehicle M changes lanes from a lane L1 to a lane L2.

Figure 9:
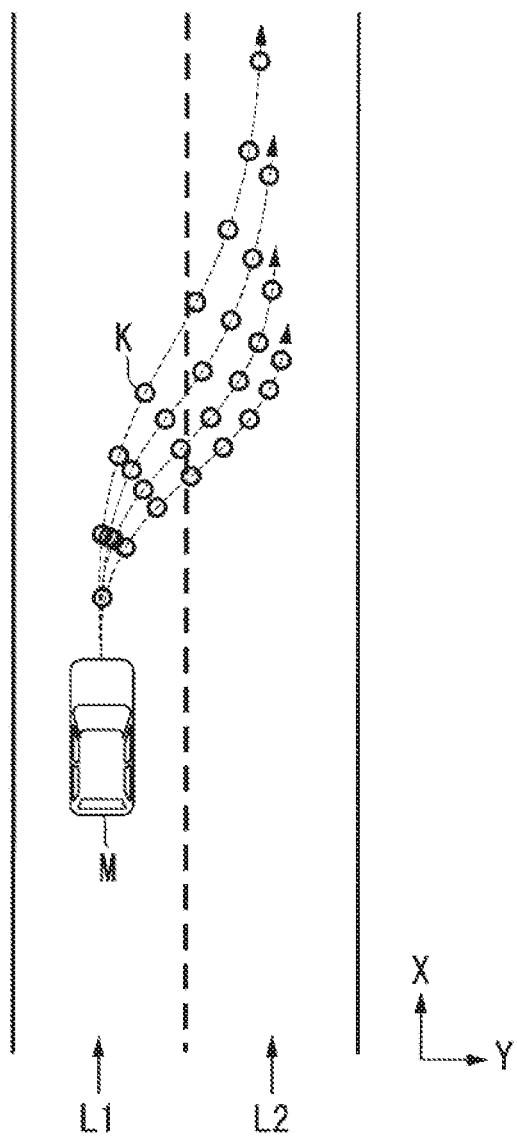
FIG. 9 is a diagram in which candidates for a course generated by a course candidate generation section are represented by course points.

Courses such as illustrated in FIG. 8, for example, are determined by the course candidate generation section 146B as collections of target positions (course points K) where the reference position (for example, the center of mass or rear wheel axle center) of the vehicle M is to arrive at predetermined times in the future. FIG. 9 is a diagram illustrating candidates for a course generated by the course candidate generation section 146B, represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 10:
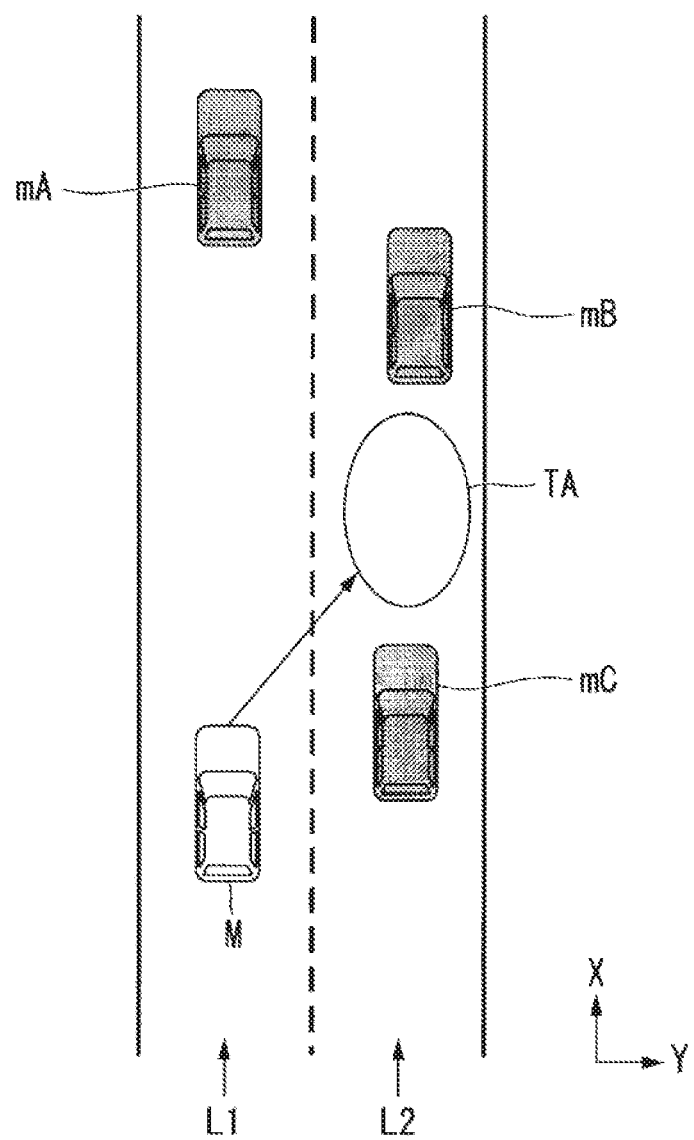
FIG. 10 is a diagram illustrating a lane change target position.

Explanation follows regarding a determination method for the target speed for performing a lane change (including at junctions). The course candidate generation section 146B first sets a lane change target position (or a merge target position). The lane change target position is set as a position relative to nearby vehicles, and determines "between which nearby vehicles to change lanes". The course candidate generation section 146B observes three nearby vehicles as references for the lane change target position, and determines a target speed for performing the lane change. FIG. 10 is a diagram illustrating a lane change target position TA. In this figure, L1 represents the lane of the vehicle, and L2 represents an adjacent lane. Here, a vehicle in front mA is defined as a nearby vehicle traveling directly in front of the vehicle M in the same lane as the vehicle M, a forward reference vehicle mB is defined as a nearby vehicle traveling directly in front of the lane change target position TA, and a rear reference vehicle mC is defined as a nearby vehicle traveling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three nearby vehicles and determines a target speed that will not interfere with any of the nearby vehicles.

Figures 11, 12:
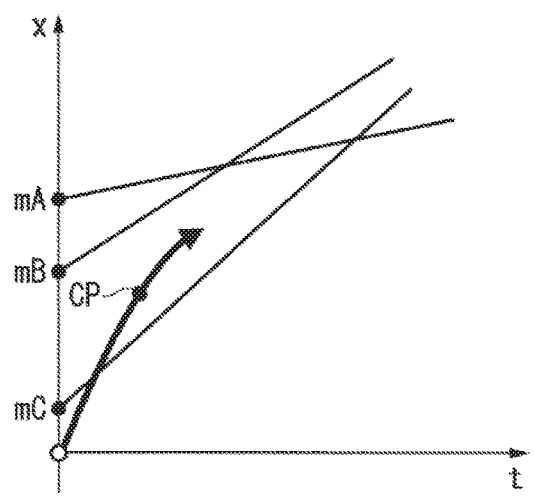
FIG. 11 is a diagram illustrating a speed generation model in a case in which the speeds of three nearby vehicles are assumed to be constant.
FIG. 12 is a table illustrating an example of mode-specific operation permission information.

FIG. 11 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at respective constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds are applied to a model such as a spline curve to derive plural candidates for the course as illustrated in FIG. 9. Note that the movement pattern of the three nearby vehicles is not limited to that of constant speeds such as illustrated in FIG. 11, and may be predicted under the assumption of constant acceleration or constant jerk.

The evaluation/selection section 146C, evaluates, for example, the candidates for the course generated by the course candidate generation section 146B from the two viewpoints of plan achievability and safety, and selects a course to be output to the traction controller 160. From the viewpoint of plan achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then returns is given a low evaluation. From the viewpoint of safety, for example, the further the distance between the vehicle M and an object (such as a nearby vehicle) and the smaller the amount of change in acceleration/deceleration, steering angle, or the like at each course point, the higher the evaluation.

The switch controller 150 switches between the automated driving mode and the manual driving mode based on a signal input from the changeover switch 87. The switch controller 150 also switches from the automated driving mode to the manual driving mode based on an operation on the configuration of the driving operation system of the HMI 70 instructing acceleration, deceleration, or steering. For example, the switch controller 150 switches from the automated driving mode to the manual driving mode (overrides) when a state in which an operation amount indicated by the signal input from the configuration of the driving operation system of the HMI 70 exceeds a threshold value has continued for a reference duration or longer. Note that after switching to the manual driving mode due to override, the switch controller 150 may return to the automated driving mode in cases in which operation on the configuration of the driving operation system of the HMI 70 has not been detected for a predetermined amount of time.

When automated driving is being implemented, the traction controller 160 controls the traction drive force output device 200, the steering device 210, and the brake device 220 such that the vehicle M passes through the course generated by the course generation section 146 at expected timings.

When a manual driving mode is being implemented (when manual driving is being implemented), the traction controller 160 sets the travel control mode based on a signal input from the changeover switch 87, the travel control mode characteristic information 190 stored in the storage section 180, and the like. The traction controller 160 controls the traction drive force output device 200, the steering device 210, and the brake device 220 based on the set travel control mode.

When notified of information relating to the automated driving mode by the automated driving controller 120, the HMI controller 170 references the mode-specific operation permission information 188, and controls the HMI 70 according to the classification of the automated driving mode.

The analysis and determination section 172 analyzes images captured by the in-cabin camera 95. Moreover, based on the analysis results thereof, the analysis and determination section 172 determines whether or not a person imaged by the in-cabin camera 95 is the same person as a person corresponding to the person information 192 stored in the storage section 180.

The learning section 174 performs predetermined processing on information acquired from the automated driving controller 120, the traction controller 160, and the like. The learning section 174 stores the results of this processing in the storage section 180. The processing of the learning section 174 will be described in detail later.

FIG. 12 is a table illustrating an example of the mode-specific operation permission information 188. The mode-specific operation permission information 188 illustrated in FIG. 12 includes "manual driving mode" and "automated driving mode" as driving mode items. The mode-specific operation permission information 188 includes "Mode A", "Mode B", "Mode C", and the like described above under "automated driving mode". The mode-specific operation permission information 188 also includes: "navigation operation", which is an operation on the navigation device 50; "content playback operation", which is an operation on the content playback device 85; "instrument panel operation", which is an operation on the display device 82; and the like as items of the non-driving operation system. In the example of the mode-specific operation permission information 188 illustrated in FIG. 12, permissions are set for operations by the vehicle occupant on the non-driving operation system for each of the driving modes described above; however, the relevant interface devices are not limited thereto.

The HMI controller 170 determines the devices for which usage is permitted (part or all of the navigation device 50 and the HMI 70) and the devices for which usage is not permitted by referencing the mode-specific operation permission information 188 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system of the HMI 70 (for example, the accelerator pedal 71, the brake pedal 74, the shift lever 76, the steering wheel 78, and the like). When the driving mode executed by the vehicle control system 100 is an automated driving mode such as Mode B or Mode C, the vehicle occupant has a responsibility to monitor the surroundings of the vehicle M. In such a case, in order to prevent activities (driver distractions) other than driving (for example, operating the HMI 70) from distracting the attention of the vehicle occupant, the HMI controller 170 performs control such that part or all of the non-driving operation system of the HMI 70 does not receive operations. At such times, in order to promote monitoring of the surroundings of the vehicle M, the HMI controller 170 may cause the presence of vehicles nearby the vehicle M that have been recognized by the environment recognition section 142 and the state of these nearby vehicles to be displayed on the display device 82 using images or the like, and the HMI controller 170 may ensure confirmation operations are received by the HMI 70 in accordance with the situation the vehicle M is traveling in.

When the driving mode is Mode A of the automated driving modes, the HMI controller 170 relaxes driver distraction restrictions and performs control such that non-driving operation system that was not receiving operations can receive operations from the vehicle occupant. For example, the HMI controller 170 displays an image on the display device 82, outputs audio through the speaker 83, or plays back content from a DVD or the like on the content playback device 85. Note that in addition to content stored on a DVD or the like, the content played back by the content playback device 85 may include, for example, various content related to leisure and entertainment, such as television programming. The "content playback operation" illustrated in FIG. 12 may also mean a content operation related to such leisure and entertainment.

Changeover Switch Function

Figure 13:
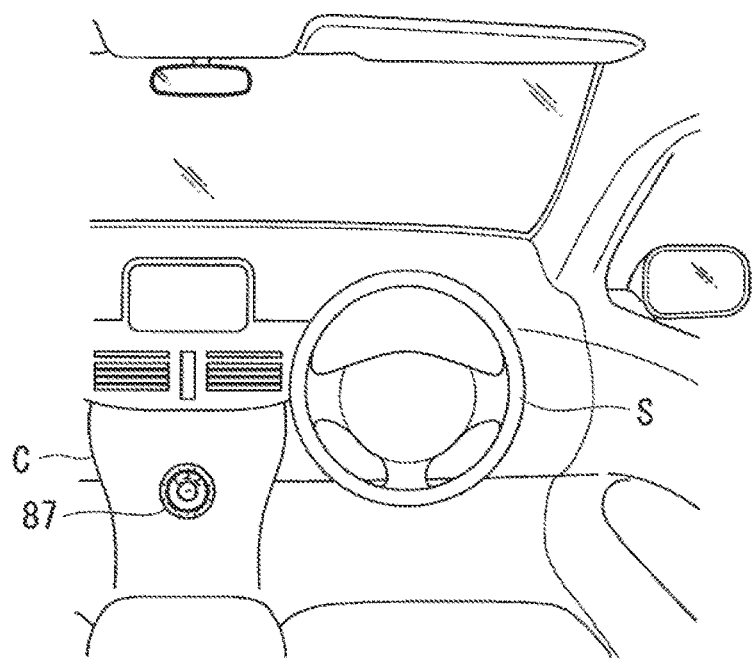
FIG. 13 is a diagram illustrating an example in which a changeover switch is installed on a center console.

The changeover switch 87 is, for example, provided to a center console C provided between the driving seat where the steering wheel S is positioned, and a front passenger seat. FIG. 13 is a diagram illustrating an example in which the changeover switch 87 is disposed on the center console C. Note that the changeover switch 87 may be attached at any position where it can be operated by a vehicle occupant, such as in the spokes of a steering wheel S or in the vicinity of the instrument panel.

Figure 14:
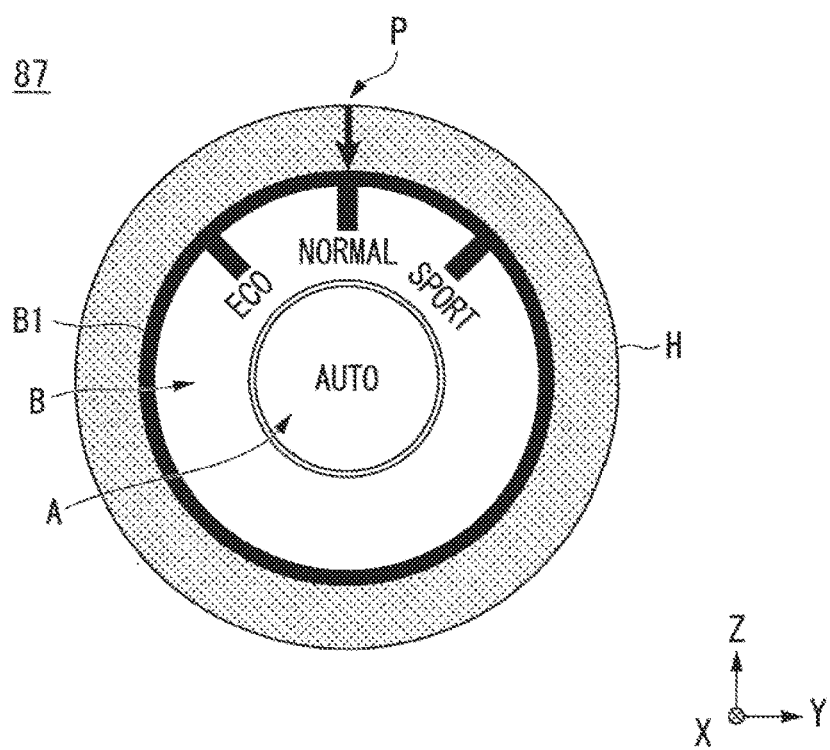
FIG. 14 is a diagram illustrating an example of the external appearance of a changeover switch.

FIG. 14 is a diagram illustrating an example of the external appearance of the changeover switch 87. In the present embodiment, explanation is given in which the changeover switch 87 is a mechanical switch. The changeover switch 87 includes an automated driving switch A, a dial switch B, and a housing H that slidably or rotatably supports the switches.

The automated driving switch A is a push switch. The switch, i.e. the automated driving switch A, is provided, for example, in the vicinity of the center of the changeover switch 87. When the automated driving switch A is push-operated by a vehicle occupant, the push operation is detected by a push operation detection mechanism, not illustrated in the drawings. When this occurs, the automated driving switch A outputs a signal indicating that the automated driving switch A has been pushed to the automated driving controller 120.

The dial switch B includes, for example, a circular cylinder shaped rotation knob B1 that surrounds the automated driving switch A. The rotation knob B1 is capable of rotating about an axis running in an X direction. The rotation knob B1 is also provided with a display design indicating the plural travel control modes. In the illustrated example, a display design running around the circumference of the rotation knob B1 includes the eco-mode ("ECO"), the normal mode ("NORMAL"), and the sports mode ("SPORT"). A reference position P is also displayed at a predetermined position on the housing H.

The dial switch B includes an encoder that detects the rotation angle of the rotation knob B1. The dial switch B outputs, to the vehicle control system 100, a signal indicating a rotation angle detected by the encoder, or a signal in which the rotation angle has been converted to a mode indicating a travel control mode. Accordingly, when the vehicle occupant operates the rotation knob B1 so as to align a desired display design with the position of the reference position P, the travel control mode corresponding to that display design is executed by the vehicle control system 100.

Figure 15:
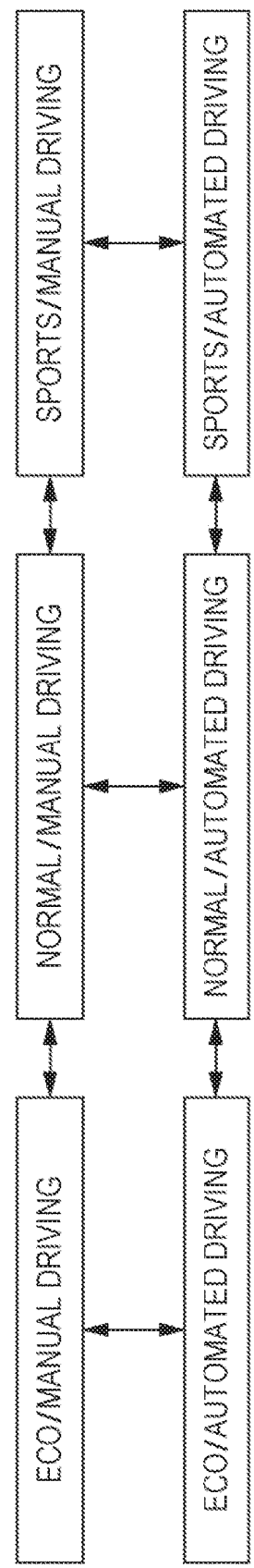
FIG. 15 is a diagram illustrating control states implemented by operating a changeover switch.

FIG. 15 is a diagram illustrating control states brought about by operation of the changeover switch 87. As described above, in the vehicle control system 100, control mode combinations are implemented combining any out of the eco mode, the normal mode, or the sports mode with either manual driving or automated driving.

In the manual driving mode, transition between "eco/manual driving" and "normal/manual driving", and transition between "normal/manual driving" and "sports/manual driving" is made by rotating the rotation knob B1.

In the automated driving mode, transition between "eco/automated driving" and "normal/automated driving", and transition between "normal/automated driving" and "sports/automated driving" is made by rotating the rotation knob B1. Moreover, transition between manual driving and automated driving is made by push operation of the automated driving switch A. In such cases, the travel control mode (eco, normal, or sports) set during manual driving may be carried over to the automated driving after switching. Moreover, the travel control mode (eco, normal, or sports) set during automated driving may be carried over to manual driving after switching. Alternatively, when switching between automated driving and manual driving, there may be an automatic transition to the normal mode (in such cases, the rotation knob B1 may be rotated by an actuator so as to return to the normal mode position).

Switching between the eco mode, the normal mode, the sports mode, automated driving, or manual driving may be executed by a touch operation or a flick operation on a GUI screen by the vehicle occupant. In such cases, if the display device 82 is a touch panel, a GUI switch for switching between the travel control modes, and between automated driving and manual driving, is displayed on the display device 82. The GUI switch may be an image with a similar external appearance to that in FIG. 14, or may be an image with a different external appearance.

Travel Control Modes

Explanation follows regarding characteristics of the respective travel control modes.

The respective travel control modes are stored in the storage section 180 as travel control mode characteristic information 190. Each travel control mode is a mode having different control characteristics in acceleration/deceleration and cornering. FIG. 16 is a diagram illustrating examples of the travel control mode characteristic information 190. Note that the following explanation is merely exemplary, and the number and types of travel control modes may be freely chosen.

"Eco/automated driving" is, for example, a travel mode of the vehicle M in which energy efficiency is higher than in "normal/automated driving". "Eco/automated driving" is, for example, the mode in which the permitted range of the behavior of the vehicle M is most restricted. "High energy efficiency" refers to a low consumption amount of energy, such as gasoline or electric power, for a predetermined travel distance of the vehicle M. For example, in "eco/automated driving", energy efficiency is increased by suppressing sudden acceleration, and by setting the shift position as high as possible. This effectively narrows the permitted range of the behavior of the vehicle M.

When automated driving is being implemented, the vehicle M sometimes overtakes other vehicles automatically. For example, in "eco/automated driving", in cases in which a relative speed between the vehicle M and another vehicle (a vehicle traveling ahead of the vehicle M) is a first relative speed (for example 40 km/h) or greater, the vehicle M is controlled so as to overtake the other vehicle. Moreover, in "eco/automated driving", the acceleration rate of the vehicle M is controlled to a threshold value Th1 (a) or lower, and the inter-vehicle distance between the vehicle M and the other vehicle is controlled to a threshold value Th1 (b) or greater. Moreover, a permitted range for cornering tightness during "eco/automated driving" is more heavily restricted than the permitted ranges for cornering tightness in the other travel control modes. For example, when turning a corner, permitted yaw rate is restricted to a smaller value in the "eco/automated driving" than "normal/automated driving."

"Normal/automated driving" is, for example, a travel mode of the vehicle M in which the energy efficiency is lower than in "eco/automated driving". "Normal/automated driving" is, for example, a mode in which the permitted range of the behavior of the vehicle M is more restricted than in "sports/automated driving".

For example, in "normal/automated driving", when the relative speed between the vehicle M and another vehicle is a second relative speed (for example 20 km/h) or greater, the vehicle M is controlled so as to overtake the other vehicle. Moreover, in "normal/automated driving", the acceleration rate of the vehicle M is controlled to a threshold value Th2 (a) or lower, and the inter-vehicle distance between the vehicle M and the other vehicle is controlled to a threshold value Th2 (b) or greater. The threshold value Th2 (a) is a greater value than the threshold value Th1 (a). The threshold value Th2 (b) is a smaller value than the threshold value Th1 (b). Moreover, the permitted range for cornering tightness during "normal/automated driving" may be more restricted than the permitted range for cornering tightness during "sports/automated driving".

"Sports/automated driving" is a travel mode of the vehicle M in which the energy efficiency is lower than in "normal/automated driving". "Sports/automated driving" is, for example, a mode in which the permitted range of the behavior of the vehicle M is broader than in "normal/automated driving".

For example, in "sports/automated driving", when the relative speed between the vehicle M and another vehicle is a third relative speed (for example 10 km/h) or greater, the vehicle M is controlled so as to overtake the other vehicle. Moreover, in "sports/automated driving", the acceleration rate of the vehicle M is controlled to a threshold value Th3 (a) or lower, and the inter-vehicle distance between the vehicle M and the other vehicle is controlled to a threshold value Th3 (b) or greater. The threshold value Th3 (a) is a greater value than the threshold value Th2 (a). The threshold value Th3 (b) is a smaller value than the threshold value Th2 (b).

One or plural of the threshold values for the relative speed, acceleration rate, and inter-vehicle distance may be the same, or may differ, between the travel control modes. For example, the threshold values relating to inter-vehicle distance may be the same for each travel control mode.

As described above, the vehicle occupant is able to easily change the travel control mode by operating the changeover switch 87. This thereby enables the preferences of a user with regard to control characteristics relating to acceleration/deceleration or cornering to be reflected during automated driving.

Moreover, the control characteristics relating to acceleration/deceleration or cornering in the travel control modes may be set so as to be scenario-specific. "Scenario-specific" includes, for example, overtaking scenarios, scenarios in which the vehicle M is traveling straight ahead, lane change scenarios, curve travel scenarios, freeway travel scenarios, and normal road travel scenarios. For example, a restriction (of the permitted range) of the acceleration rate, this being a control characteristic of the travel control modes, may be a restriction that is applied when the vehicle M is overtaking a vehicle traveling ahead, and not applied in other scenarios.

Moreover, for example, in addition to, or instead of, the acceleration rate, inter-vehicle distance, and relative speeds, the control characteristics of the travel control modes may include restrictions to control amounts for deceleration rate and power source, or restrictions to a Continuously Variable Transmission (CVT) ratio. Moreover, for example, control amounts of an air-conditioner installed in the vehicle M or a timing for idling stop when the vehicle M is stationary may be set as control characteristics. For example, control characteristics for when the travel control mode is "eco/automated driving" are restricted so as to tend toward increased energy efficiency in comparison to the other travel control modes. For example, a control amount of the air-conditioner is controlled so as to be lower than in the other travel control modes, and idling stop is controlled so as to be executed more readily than in the other travel control modes.

Images Displayed on Display Device

Figure 17:
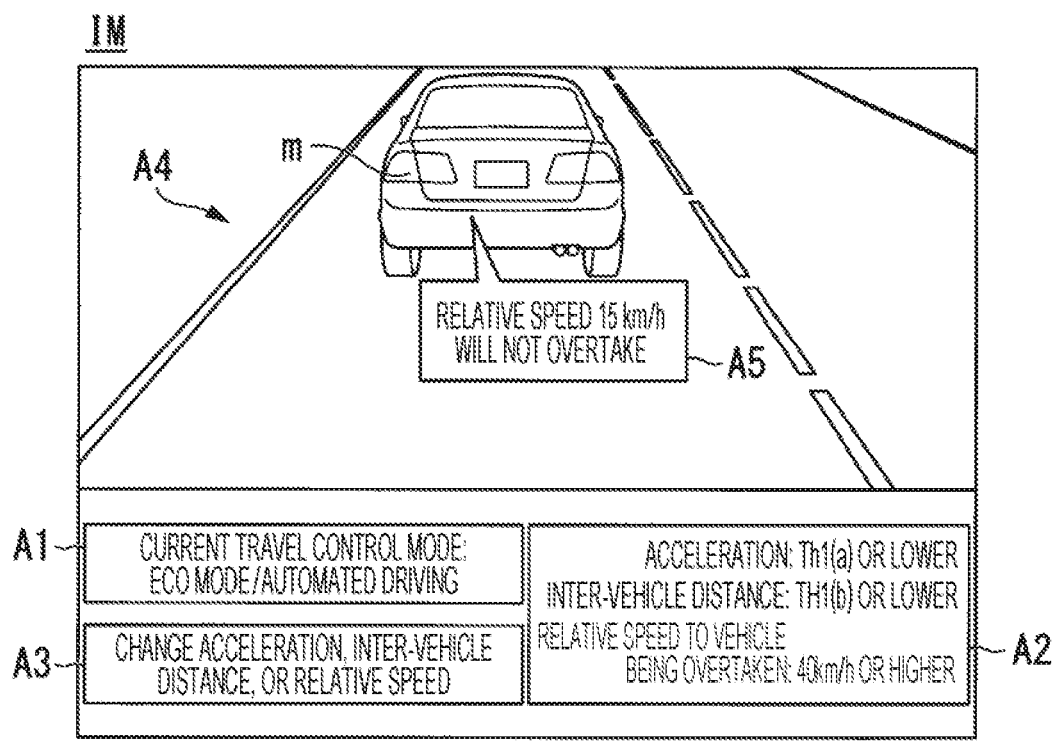
FIG. 17 is a diagram illustrating an example of an interface image displayed on a display device.

FIG. 17 is a diagram illustrating an example of an interface image IM that is displayed on the display device 82. The interface image IM includes, for example, a region A1 displaying the current travel control mode, a region A2 displaying the permitted ranges corresponding to the travel control mode, a region A3 for receiving changes to the permitted ranges, a region A4 displaying an image ahead of the vehicle M captured by the camera 40, and a region A5 displaying whether or not another vehicle m traveling ahead of the vehicle M is an overtaking target, and also displaying the relative speed between the other vehicle m and the vehicle M.

For example, the vehicle occupant of the vehicle M changes the driving mode of the vehicle M by the vehicle control system 100 by operating the changeover switch 87. For example, in the illustrated example, if the vehicle occupant wishes to overtake the other vehicle m, the occupant may push-operate the automated driving switch A. The automated driving mode is thereby switched to the manual driving mode. The vehicle occupant is then able to overtake the other vehicle m by controlling the vehicle M in the manual driving mode so as to overtake.

Moreover, for example, in the illustrated example, if the vehicle occupant wishes to overtake the other vehicle m, the vehicle occupant may rotate the rotation knob B1 to set the travel control mode by the vehicle control system 100 to "sports/automated driving". The travel control mode is thus switched from "eco/automated driving" to "sports/automated driving". The vehicle M is thereby controlled so as to overtake the other vehicle m having a relative speed of 15 km/h or greater.

As described above, due to displaying the travel control mode set in the vehicle M, or displaying control characteristics corresponding to the travel control mode on the display device 82, the vehicle occupant is able to easily recognize the state of the vehicle settings. Moreover, the vehicle occupant is able to predict the likely behavior of the vehicle M. The vehicle occupant can then selectively operate the changeover switch 87 based on the outcome of their prediction. This thereby enables the preferences of a user with regard to control characteristics relating to acceleration/deceleration or cornering to be reflected during automated driving.

Vehicle Occupant Identification and Travel Control Mode Setting

The person information 192 is stored with feature amounts of a facial image of a person. The person information 192 is, for example, stored with feature amounts of a facial image of a person holding the right to drive (operate) the vehicle M. There are no particular limitations to the method for storing facial image feature amounts in the storage section 180 as the person information 192. For example, in cases in which a registration switch is operated in order to register a vehicle occupant, the in-cabin camera 95 actuates and images the vehicle occupant. The analysis and determination section 172, described later, then extracts feature amounts from the captured facial image, and stores the extracted feature amounts in the storage section 180 as the person information 192. Feature amounts of the facial image of the vehicle occupant holding the right to drive are thereby stored in the storage section 180.

Figure 18:
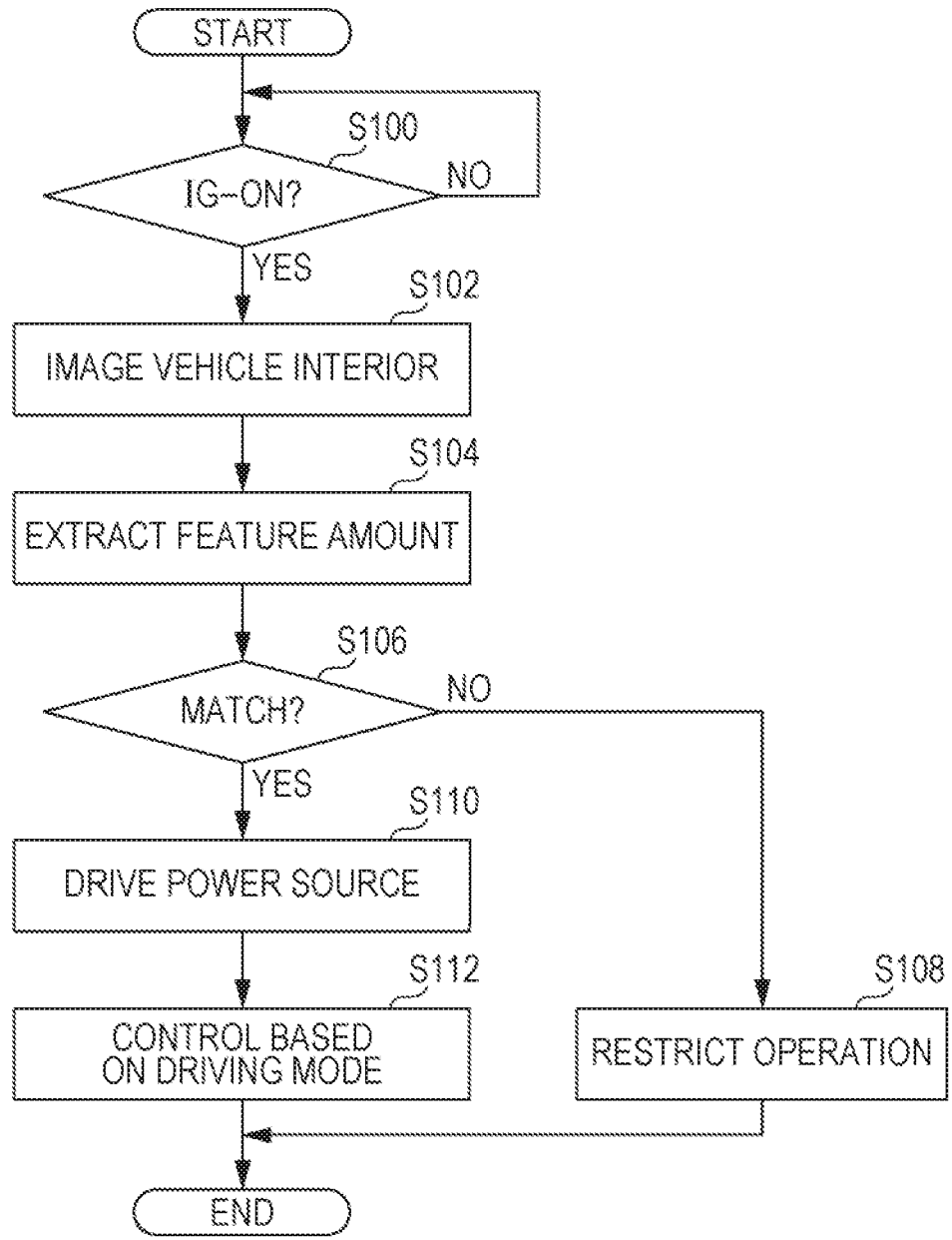
FIG. 18 is a diagram illustrating an example of processing in which a vehicle occupant is identified by an analysis and determination section.

FIG. 18 is a diagram illustrating an example of processing for identification of the vehicle occupant by the analysis and determination section 172. First, the HMI controller 170 stands by for an operation to place the ignition switch in the ON state (step S100). When an operation is performed to place the ignition switch in the ON state, the in-cabin camera 95 images the vehicle cabin interior, and outputs the captured image data to the analysis and determination section 172 (step S102).

Next, the analysis and determination section 172 analyzes the captured data and extracts feature amounts from the captured data (step S104). The analysis and determination section 172 determines whether or not feature amounts matching the extracted feature amounts are stored in the person information 192 (step S106). In cases in which feature amounts matching the extracted feature amounts are not stored in the person information 192, the HMI controller 170 restricts all or some operation of the vehicle M (step S108). The processing of the flowchart is thereby ended.

In cases in which feature amounts matching the extracted feature amounts are stored in the person information 192, the HMI controller 170 does not restrict operation of the vehicle M. The power source is thereby driven (step S110). Next, the vehicle control system 100 controls the vehicle M based on a preset driving mode (step S112). The processing of the flowchart is thereby ended.

Note that the preset driving mode is, for example, a driving mode of initial settings, or a default driving mode. The default driving mode is a combination of manual driving or automated driving with any control mode out of the eco mode, normal mode, or sports mode, associated with the vehicle occupant holding the right to drive stored in the storage section 180. Setting of the default driving mode will be described in detail later.

The processing described above enables the vehicle control system 100 to set a driving mode based on the feature amounts of the vehicle occupant contained in a captured image. As a result, this enables the preferences of a user with regard to control characteristics relating to acceleration/deceleration or cornering to be reflected during automated driving.

Note that here, whether or not a vehicle occupant has the right to drive the vehicle M is determined based on the feature amounts of a facial image. Alternatively, or in addition, whether or not a vehicle occupant has the right to drive the vehicle M may be determined using biometric information such as fingerprints, voice, iris pattern, or the like.

Learning Section Processing 1

For example, as the occupant-specific vehicle behavior information 194, the learning section 174 stores the behavior of the vehicle M after being started up in the storage section 180 for when the vehicle M is started up in a state in which the vehicle occupant has been identified in the manner described with reference to FIG. 18.

Figure 19:
FIG. 19 is a diagram illustrating an example of occupant-specific vehicle behavior information.

FIG. 19 is a diagram illustrating an example of the occupant-specific vehicle behavior information 194. The occupant-specific vehicle behavior information 194 is information regarding the behavior of the vehicle M when manual driving is being implemented. For example, the occupant-specific vehicle behavior information 194 is generated for each vehicle occupant (set of personal feature amounts). The occupant-specific vehicle behavior information 194 is information stored by date and time for acceleration rate, speed, inter-vehicle distance with respect to vehicles traveling ahead, deceleration rate, angular velocity about a vertical axis (yaw rate), and the like of the vehicle M.

The learning section 174 generates travel control mode parameters based on the occupant-specific vehicle behavior information 194. For example, the learning section 174 processes the occupant-specific vehicle behavior information 194 statistically to generate parameters for the travel control modes so as to reflect the operation of the vehicle occupant during manual driving. The travel control mode parameters refer to some or all of the threshold values indicating the control characteristics of the respective travel control modes when automated driving is being implemented. The learning section 174 stores the generated travel control mode parameters in the storage section as the occupant-specific travel control mode characteristic information 196.

Figure 20:
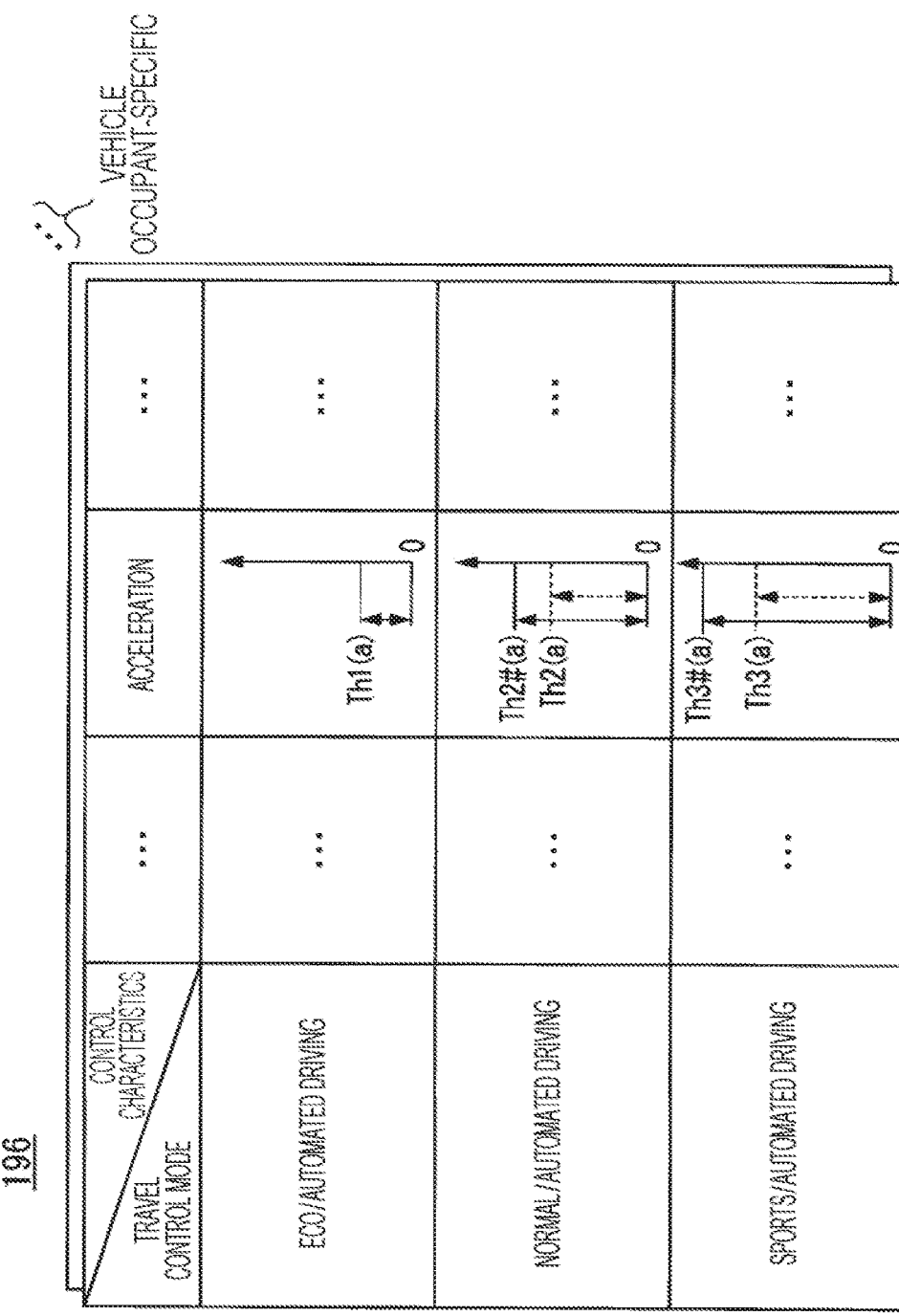
FIG. 20 is a diagram illustrating an example of occupant-specific travel control mode characteristic information generated by a learning section.

FIG. 20 is a diagram illustrating an example of the occupant-specific travel control mode characteristic information 196 generated by the learning section 174. For example, for each travel control mode, the learning section 174 reflects vehicle behaviors, such as frequently used acceleration rates, for when manual driving is being implemented by a particular vehicle occupant in the control characteristics for the corresponding travel control mode in automated driving. This occupant-specific travel control mode characteristic information 196 is set as the default control characteristics for each travel control mode in automated driving when the vehicle occupant associated with the occupant-specific travel control mode characteristic information 196 starts up (switches on) the vehicle M.

The learning section 174 may also generate parameters for predetermined scenarios. Predetermined scenarios include, for example, scenarios such as lane changing by the vehicle M, overtaking of a vehicle in front, and scenarios when traveling on particular roads such as expressways. For example, suppose a particular vehicle occupant tends to control the vehicle M with a high acceleration rate in the scenario of overtaking a vehicle in front. In such cases, when automated driving is being implemented, for example, a threshold value for the acceleration rate when the vehicle M overtakes a vehicle in front is changed so as to be higher than a preset threshold value for that travel control mode.

As described above, the travel control modes are set with parameters adapted to the driving characteristics of the occupant by the learning section 174 generating the occupant-specific travel control mode characteristic information 196 based on the occupant-specific vehicle behavior information 194. This thereby enables the preferences of a user with regard to control characteristics relating to acceleration/deceleration or cornering to be reflected during automated driving.

Learning Section Processing 2

For example, when the vehicle M is started up in a state in which the vehicle occupant has been identified in the manner described with reference to FIG. 18, the learning section 174 stores the travel control mode of the vehicle M after being started up in the storage section 180 as the travel control mode selection history information 198.

Figure 21:
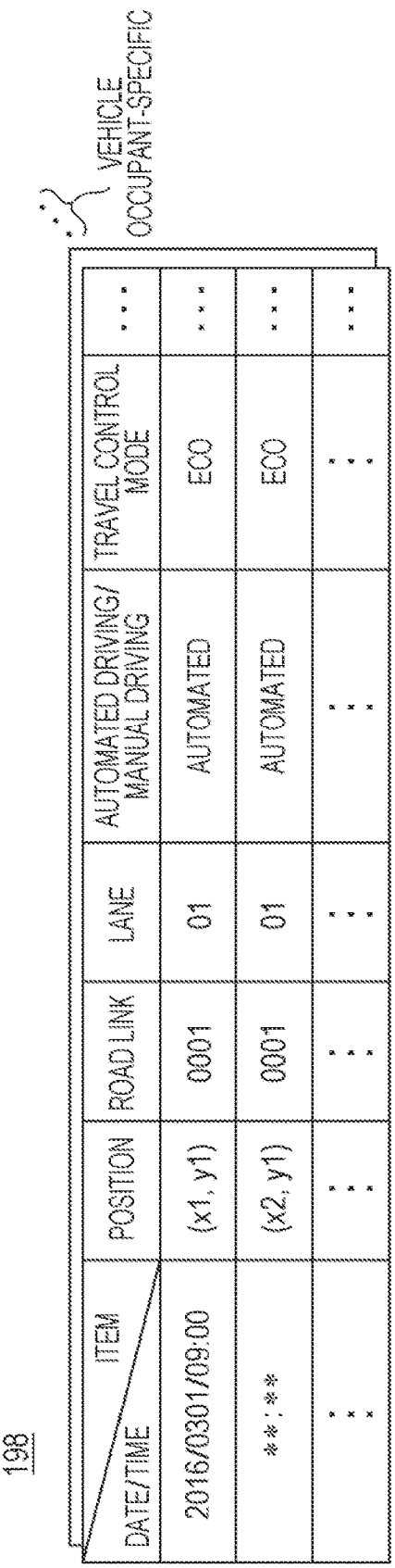
FIG. 21 is a diagram illustrating an example of travel control mode selection history information.

FIG. 21 is a diagram illustrating an example of the travel control mode selection history information 198. The travel control mode selection history information 198 is information relating to a history of the travel control modes set in the vehicle M. The travel control mode selection history information 198 is, for example, information generated for each vehicle occupant. The learning section 174 generates the travel control mode selection history information 198 by associating automated driving travel control modes with predetermined segments (such as road links), based on the automated driving travel control modes set by the driving mode controller 130, and information retained by the vehicle M when setting the automated driving travel control mode. The information retained by the vehicle M when setting the automated driving travel control mode refers to information acquired when the vehicle M implements automated driving, and includes, for example, such information contained in the travel control mode selection history information 198 as position information, road link and lane information, information indicating whether or not automated driving is being implemented, information indicating whether or not manual driving is being implemented, and other information. As a result, the travel control mode selection history information 198 is configured by date-and-time-specific information indicating position information of the vehicle M, information indicating road links on which the vehicle M has traveled, lanes in which the vehicle M has traveled, and whether or not automated driving was being implemented, as well as information in which the set travel control mode, such as the eco, normal, or sports travel control mode, is stored.

For example, the learning section 174 processes the travel control mode selection history information 198 statistically to set road link-specific travel control modes. The learning section 174 stores the set road link-specific travel control modes in the storage section 180 as the road-specific travel control mode characteristic information 199. The road-specific travel control mode characteristic information 199 is, for example, generated for each vehicle occupant. The road-specific travel control mode characteristic information 199 is used to set the "default driving mode" when the vehicle occupant associated with the road-specific travel control mode characteristic information 199 starts up (switches on) the vehicle M and has set a destination.

Figure 22:
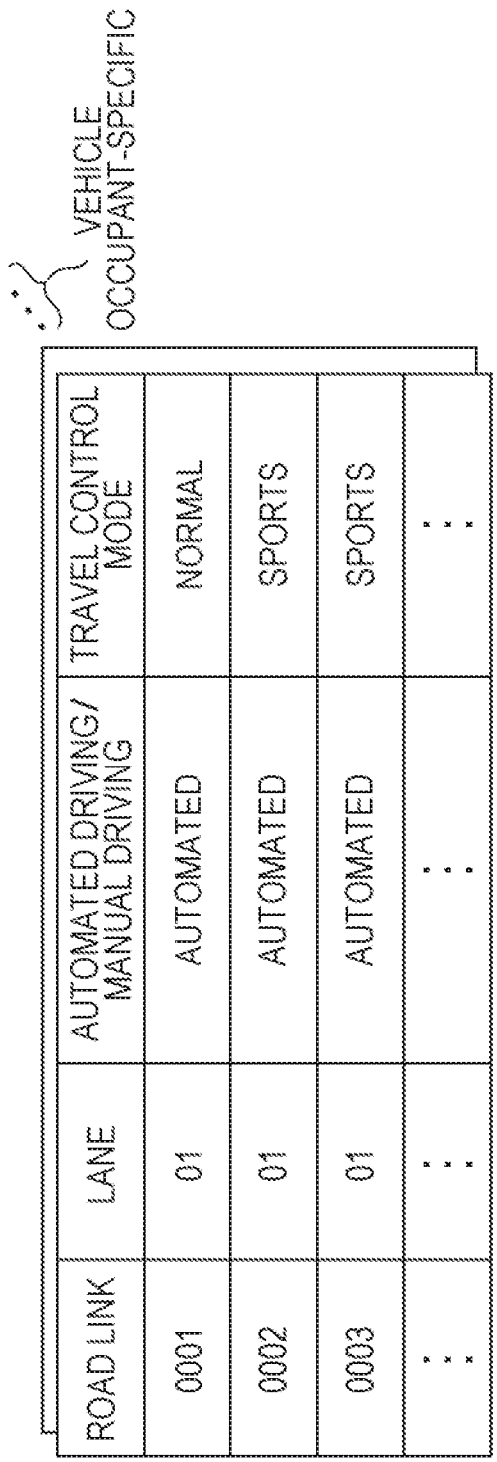
FIG. 22 is a diagram illustrating an example of road-specific travel control mode characteristic information set by a learning section.

FIG. 22 is a diagram illustrating an example of the road-specific travel control mode characteristic information 199 set by the learning section 174. For example, if a vehicle occupant has exhibited a tendency to set "normal/automated driving" for road link "0001", "sports/automated driving" for road link "0002", and "sports/automated driving" for road link "0003", the learning section 174 sets the travel control mode for each road link and generates the road-specific travel control mode characteristic information 199 based on these tendencies.

The learning section 174 may further associate travel control modes in manual driving with predetermined segments based on the manual driving travel control modes and information retained by the vehicle M when setting the manual driving travel control modes. The learning section 174 may further associate manual driving settings or automated driving settings by predetermined segments based on switching between manual driving and automated driving, and information retained by the vehicle M when switching.

Figure 23:
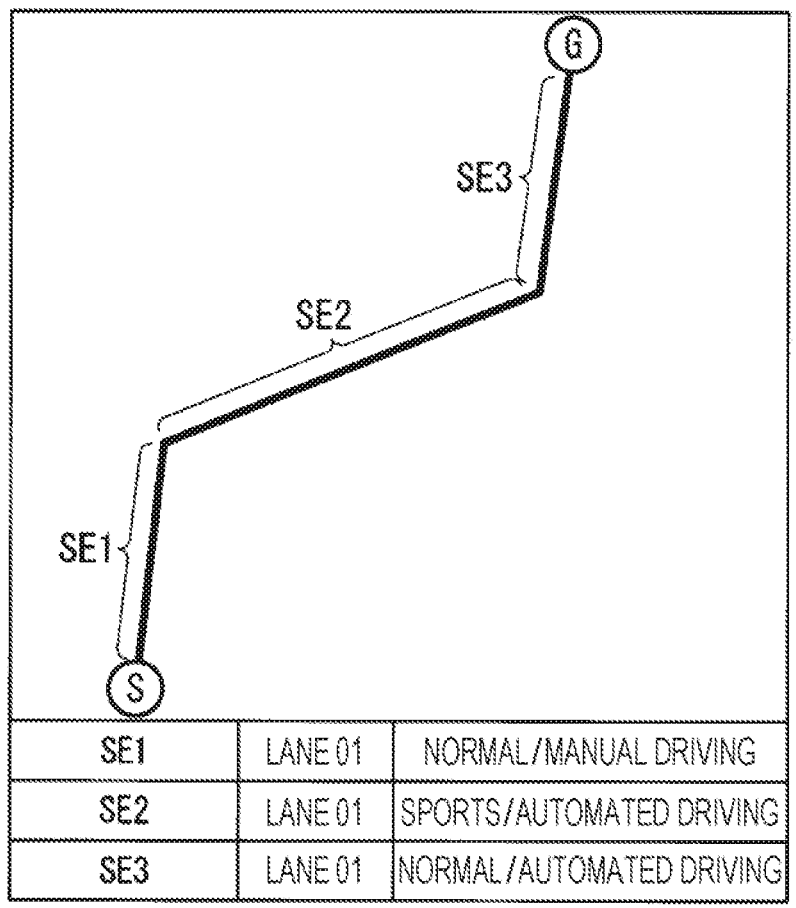
FIG. 23 is a diagram illustrating an example of an interface image displayed on a display device when an ignition is in an ON state and a destination has been set.

FIG. 23 is a diagram illustrating an example of an interface image IM2 that is displayed on the display device 82 when the ignition switch has been placed in the ON state and a destination has been set. For example, when a destination has been set, a route from the current location of the vehicle M to the destination is generated. The driving mode controller 130 references the road-specific travel control mode characteristic information 199, and sets the travel control modes associated with the road links in the generated route. Moreover, the route and planned driving lanes are displayed on the display device 82 together with the travel control modes corresponding to the route and lanes.

In FIG. 23, the section SE1 corresponds to the road link "0001", the section SE2 corresponds to the road link "0002", and the section SE3 corresponds to the road link "0003". In this case, as illustrated in FIG. 23, by following the travel control modes set in FIG. 22, the "default driving mode" is set to "normal/manual driving" in section SE1, "sports/automated driving" in section SE2, and "normal/manual driving" in section SE3, and these setting states are displayed on the display device 82. Moreover, as illustrated in FIG. 23, information indicating a plan to travel in the lane associated with the identifying information "lane 01" in the sections SE1 to SE3 is also displayed on the display device 82. For example, when a vehicle occupant uses the same route for daily commute, this kind of default settings would be found useful.

Note that in this case, the vehicle occupant may apply the travel control mode set as the "default driving mode", or may change the travel control mode set as the "default driving mode". For example, the interface image IM2 may include a GUI screen or the like to ask whether or not to change the "default driving mode", and to receive any changes.

Moreover, in the example described above, explanation has been given regarding a case in which the travel control mode is set for each road link. However, the travel control mode may be set according to the road type (expressway, normal road) or the surrounding environment in which the vehicle M is traveling (for example weather, temperature, road surface conditions, and the like). For example, the learning section 174 stores information associating the surrounding environment in which the vehicle M is traveling with travel control modes in the travel control mode selection history information 198. The learning section 174 may then generate travel control mode information set for each environment based on the travel control mode selection history information 198.

According to the embodiment described above, the vehicle control system 100 includes a reception section configured to receive a selection operation for one or more driving modes by an occupant of a vehicle from out of plural driving modes having different control characteristics related to acceleration/deceleration or cornering, and an automated driving controller configured to perform automated driving in which at least one of speed control or steering control of the vehicle is controlled automatically based on the driving mode received as the selection operation by the reception section. This thereby enables the preferences of a user with regard to control characteristics relating to acceleration/deceleration or cornering to be reflected during automated driving.

Explanation has been given regarding an embodiment for implementing the present disclosure. However, the present disclosure is not limited in any way by this embodiment, and various modifications or substitutions may be applied within a range not departing from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control system comprising:
   a changeover switch configured to receive a selection operation for one or more driving modes by an occupant of a vehicle from out of a plurality of driving modes having different control characteristics related to acceleration-and-deceleration or cornering from each other; and
   an automated driving controller configured to perform automated driving of the vehicle in which at least one of speed control and steering control of the vehicle is controlled automatically in accordance with the driving mode received as the selection operation by the changeover switch, wherein the plurality of driving modes includes a first driving mode, a second driving mode having a higher energy efficiency than the first driving mode, and a third driving mode having looser restrictions related to acceleration-and-deceleration or cornering than the first driving mode, wherein:

the automated driving controller is configured to, when a relative speed between the vehicle and another vehicle traveling ahead of the vehicle is a threshold value or greater, enable to perform control to overtake the another vehicle, the first driving mode has a first threshold value as the threshold value to be applied when the vehicle is driving in the first driving mode, third driving mode has a third threshold value as the threshold value to be applied when the vehicle is driving in the third driving mode, and the third threshold value of the third driving mode is smaller than the first threshold value of the first driving mode.

2. The vehicle control system according to claim 1, wherein the automated driving controller is configured to, when overtaking another vehicle traveling ahead of the vehicle while the automated driving is executed, change one of a relative speed between the vehicle and the another vehicle, an inter-vehicle distance, or an acceleration rate of the vehicle, in accordance with the driving mode.

3. The vehicle control system according to claim 1, wherein in addition to receiving the selection operation, the changeover switch is also configured to receive a selection operation to transition to the automated driving from manual driving in which driving control is based on an operation device configured to receive an operation of the occupant of the vehicle.

4. The vehicle control system according to claim 3, wherein the changeover switch includes a push switch configured to receive the selection operation to transition from the manual driving to the automated driving, and a dial switch configured to receive the selection operation for selecting the driving mode from the plurality of driving modes.

5. The vehicle control system according to claim 1, wherein the automated driving controller is configured to:
switch from the automated driving to manual driving in which driving control is based on an operation device configured to receive an operation of the occupant of the vehicle, and
reflect, to the driving modes, the driving control performed by the operation device when the manual driving is being implemented.

6. The vehicle control system according to claim 1, further comprising:
a storage device configured to store a feature amount of an image captured of a person and the driving mode associated with the feature amount;
a camera configured to capture an image within the vehicle; and
an analysis and determination section configured to extract a feature amount from the image captured by the camera, and determine whether or not the extracted feature amount matches the feature amount stored in the storage device; wherein
the automated driving controller is configured to set the driving mode associated with the matched feature amount stored in the storage device when the analysis and determination section has determined that the feature amounts match.

7. The vehicle control system according to claim 5, further comprising a processor configured to generate a parameter of the driving mode by using information about the driving control performed by the operation device while the manual driving is being implemented.

8. The vehicle control system according to claim 1, further comprising:
a processor configured to associate the driving mode with each predetermined segment of a road based on information about the driving mode set by the automated driving controller and information retained by the vehicle when setting the driving mode.

9. A vehicle control method executed by an on-board computer, the method comprising:
(i) receiving a selection operation for one or more driving modes by an occupant of a vehicle from out of a plurality of driving modes having different control characteristics related to acceleration-and-deceleration or cornering from each other; and
(ii) performing automated driving of the vehicle in which at least one of speed control and steering control of the vehicle is controlled automatically in accordance with the driving mode received as the selection operation,
wherein the plurality of driving modes includes a first driving mode, a second driving mode having a higher energy efficiency than the first driving mode, and a third driving mode having looser restrictions related to acceleration-and-deceleration or cornering than the first driving mode,
wherein:
the step (ii) comprising, when a relative speed between the vehicle and another vehicle traveling ahead of the vehicle is a threshold value or greater, enabling to perform control to overtake the another vehicle,
the first driving mode has a first threshold value as the threshold value to be applied when the vehicle is driving in the first driving mode,
third driving mode has a third threshold value as the threshold value to be applied when the vehicle is driving in the third driving mode, and
the third threshold value of the third driving mode is smaller than the first threshold value of the first driving mode.

10. A non-transitory computer readable medium storing a vehicle control program for causing an on-board computer to execute processing, the processing comprising:
(i) receiving a selection operation for one or more driving modes by an occupant of a vehicle from out of a plurality of driving modes having different control characteristics related to acceleration-and-deceleration or cornering from each other; and
(ii) performing automated driving of the vehicle in which at least one of speed control and steering control of the vehicle is controlled automatically in accordance with the driving mode received as the selection operation,
wherein the plurality of driving modes includes a first driving mode, a second driving mode having a higher energy efficiency than the first driving mode, and a third driving mode having looser restrictions related to acceleration-and-deceleration or cornering than the first driving mode,
wherein:
the step (ii) comprising, when a relative speed between the vehicle and another vehicle traveling ahead of the vehicle is a threshold value or greater, enabling to perform control to overtake the another vehicle, the first driving mode has a first threshold value as the threshold value to be applied when the vehicle is driving in the first driving mode, third driving mode has a third threshold value as the threshold value to be applied when the vehicle is driving in the third driving mode, and the third threshold value of the third driving mode is smaller than the first threshold value of the first driving mode.

11. The vehicle control system according to claim 8, wherein when a route to a destination of the vehicle is generated, the automated driving controller selects the driving mode for the each predetermined segment of the road included in the route, by referring to the associated driving mode with the each predetermined segment of the road.

12. The vehicle control system according to claim 1, further comprising:

a processor configured to associate the driving mode with surrounding environment in which the vehicle is traveling based on information about the driving mode set by the automated driving controller and information retained by the vehicle when setting the driving mode.

* * * * *